United States Patent
Hoshino

(10) Patent No.: US 8,502,863 B2
(45) Date of Patent: *Aug. 6, 2013

(54) STEREOSCOPIC IMAGING APPARATUS

(75) Inventor: Kenji Hoshino, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/202,721

(22) PCT Filed: Nov. 22, 2010

(86) PCT No.: PCT/JP2010/070778
§ 371 (c)(1),
(2), (4) Date: Aug. 22, 2011

(87) PCT Pub. No.: WO2011/121841
PCT Pub. Date: Oct. 6, 2011

(65) Prior Publication Data
US 2012/0038753 A1 Feb. 16, 2012

(30) Foreign Application Priority Data
Mar. 31, 2010 (JP) ................................. 2010-081052

(51) Int. Cl.
*H04N 15/00* (2006.01)
*H04N 13/02* (2006.01)

(52) U.S. Cl.
USPC ............................ 348/46; 382/154; 396/322

(58) Field of Classification Search
USPC ............................... 348/46; 382/154; 396/322
See application file for complete search history.

(56) References Cited

U.S. PATENT DOCUMENTS

| 5,740,337 | A | 4/1998 | Okino et al. |
| 5,786,847 | A | 7/1998 | Katayama et al. |
| 7,001,024 | B2 * | 2/2006 | Kitaguchi et al. ............. 353/70 |

(Continued)

FOREIGN PATENT DOCUMENTS

| CN | 101080921 A | 11/2007 |
| EP | 1 505 539 A2 | 2/2005 |

(Continued)

OTHER PUBLICATIONS

Translation of JP 2006-162991 "Nakazawa", generated using AIPN tool at http://dossier1.ipdl.inpit.go.jp/AIPN/odse_top_dn.ipdl?N0000=7400.*

(Continued)

*Primary Examiner* — Mehrdad Dastouri
*Assistant Examiner* — Jeremaiah C Hallenbeck-Huber
(74) *Attorney, Agent, or Firm* — Birch, Stewart, Kolasch & Birch, LLP.

(57) ABSTRACT

A cut-out process of image corresponding to an amount of optical axis deviation of left and right imaging optical systems is applied to left and right images acquired by the left and right imaging units to correct an optical axis deviation. In this case, the amount of optical axis deviation corresponding to a current focus position is acquired from the amounts of optical axis deviation detected in accordance with focus positions stored in advance in a storage unit (step S38). A cut-out process of image for stereoscopic display is applied to the left and right images based on the acquired amount of optical axis deviation (step S40). As a result, the optical axis deviation of the left and right imaging optical systems can be excellently corrected regardless of the focus position (subject distance).

9 Claims, 17 Drawing Sheets

U.S. PATENT DOCUMENTS

| | | | |
|---|---|---|---|
| 7,129,974 B2 * | 10/2006 | Morichika | 348/231.99 |
| 7,265,787 B2 * | 9/2007 | Takane | 348/335 |
| 7,596,286 B2 * | 9/2009 | Nose et al. | 382/300 |
| 7,636,088 B2 * | 12/2009 | Nomura et al. | 345/419 |
| 8,023,009 B2 * | 9/2011 | Cho | 348/241 |
| 2003/0223007 A1 | 12/2003 | Takane | |
| 2004/0001138 A1 * | 1/2004 | Weerashinghe et al. | 348/36 |
| 2005/0213159 A1 * | 9/2005 | Okada et al. | 358/3.26 |
| 2006/0274170 A1 * | 12/2006 | Azuma | 348/246 |
| 2007/0236595 A1 | 10/2007 | Pan et al. | |
| 2008/0131107 A1 * | 6/2008 | Ueno | 396/50 |
| 2008/0211956 A1 | 9/2008 | Imada et al. | |
| 2009/0115885 A1 * | 5/2009 | Shabtay et al. | 348/347 |
| 2010/0085439 A1 * | 4/2010 | Lin | 348/222.1 |

FOREIGN PATENT DOCUMENTS

| | | |
|---|---|---|
| EP | 1 635 138 A1 | 3/2006 |
| JP | 7-95623 A | 4/1995 |
| JP | 8-317424 A | 11/1996 |
| JP | 8-336165 A | 12/1996 |
| JP | 11-355813 A | 12/1999 |
| JP | 2004-7304 A | 1/2004 |
| JP | 2004-126905 A | 4/2004 |
| JP | 2004-145022 A | 5/2004 |
| JP | 2006-162991 A | 6/2006 |
| JP | 2007-282245 A | 10/2007 |
| WO | WO 2006/062325 A1 | 6/2006 |
| WO | WO 2006/064770 A1 | 6/2006 |

OTHER PUBLICATIONS

Translation of JP 08-317424 "Nakamura", generated using AIPN tool at http://dossier1.ipdl.inpit.go.jp/AIPN/odse_top_dn.ipdl?N0000=7400.*

* cited by examiner

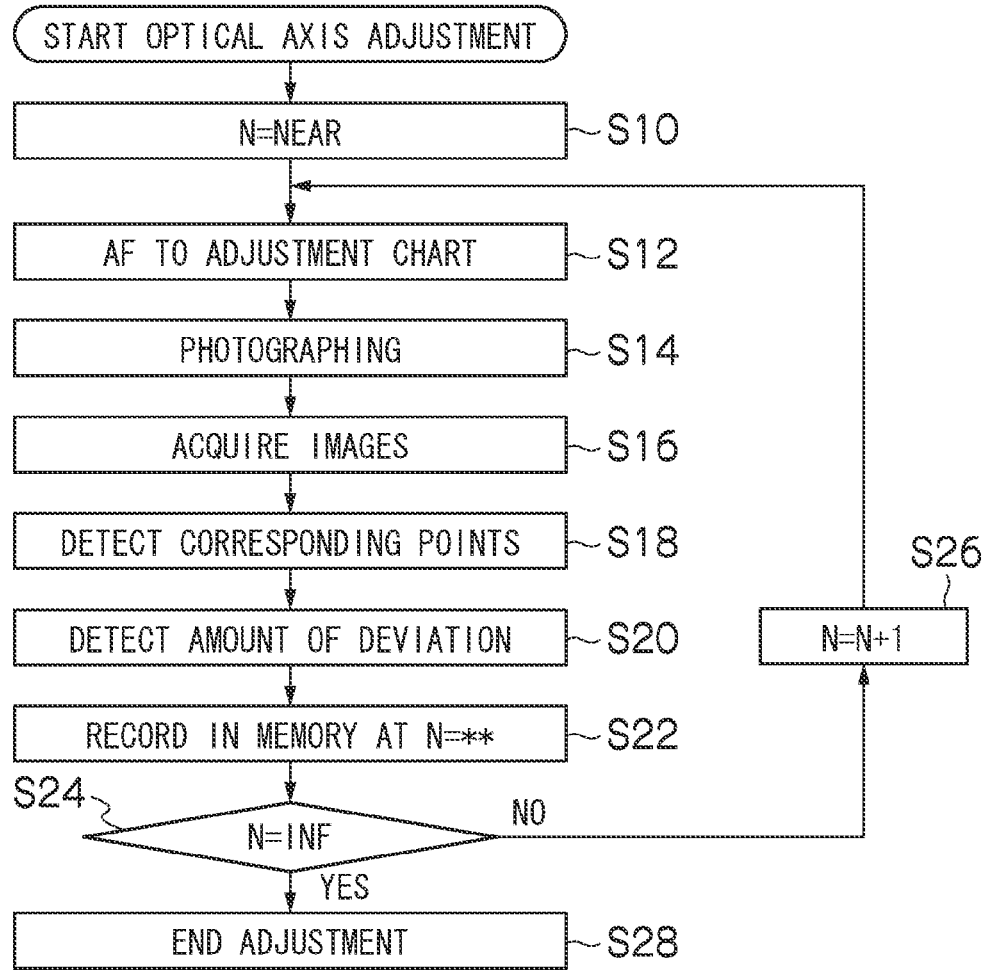

FIG.7

| (F-pos) | | (Z-pos) Z1 | Z2 | Z3 | ... | Zn |
|---|---|---|---|---|---|---|
| | NEAR | 2 | 3 | 4 | ... | 10 |
| | CALCULATION | | | | | |
| | CALCULATION | | LINEARLY CALCULATE. | | | |
| | CALCULATION | | OR CALCULATE BY 1/DISTANCE | | | |
| | CALCULATION | | | | | |
| | CALCULATION | | | | | |
| | INF | 4 | 5 | 6 | ... | 18 |

FIG.10A

TABLE FOR THROUGH IMAGE

| Z-pos | V-LEFT | V-RIGHT |
|---|---|---|
| Z1 | 3 | −3 |
| Z2 | 5 | −5 |
| Z3 | 8 | −8 |
| Z4 | 10 | −10 |
| Z5 | 12 | −12 |
| Z6 | 14 | −14 |
| Z7 | 16 | −16 |
| Z8 | 18 | −18 |
| Z9 | 20 | −20 |
| Z10 | 22 | −22 |

FIG.10B

TABLE FOR STILL IMAGE

| Z-pos | V-LEFT | V-RIGHT |
|---|---|---|
| Z1 | 2 | −2 |
| Z2 | 4 | −4 |
| Z3 | 7 | −7 |
| Z4 | 9 | −9 |
| Z5 | 11 | −11 |
| Z6 | 13 | −13 |
| Z7 | 15 | −15 |
| Z8 | 17 | −17 |
| Z9 | 19 | −19 |
| Z10 | 21 | −21 |

FIG.10C

TABLE FOR MOVING IMAGE

| Z-pos | V-LEFT | V-RIGHT |
|---|---|---|
| Z1 | 5 | −5 |
| Z2 | 7 | −7 |
| Z3 | 10 | −10 |
| Z4 | 12 | −12 |
| Z5 | 14 | −14 |
| Z6 | 16 | −16 |
| Z7 | 18 | −18 |
| Z8 | 20 | −20 |
| Z9 | 22 | −22 |
| Z10 | 24 | −24 |

(WITHOUT DISTORTION CORRECTION)

STEREOSCOPIC IMAGING APPARATUS

TECHNICAL FIELD

The present invention relates to a stereoscopic imaging apparatus, and particularly, to a stereoscopic imaging apparatus that takes a plurality of images with a parallax.

BACKGROUND ART

A stereoscopic imaging apparatus uses two imaging units horizontally arranged with a parallax to take images of the same subject from left and right viewpoints and acquires an image for left eye and an image for right eye. The acquired left and right images are inputted to a 3D display capable of three-dimensional (3D) display and displayed to allow the left and right eyes to separately view the images. In this way, the images can be recognized as a stereoscopic image.

Imaging optical systems of the two imaging units usually have the same performance and characteristics, and the imaging optical systems are adjusted and incorporated into the main body of the apparatus so that the optical axes of the imaging optical systems coincide.

However, the two imaging optical systems have individual differences. Therefore, if the zoom magnification is changed, which involves lens movement, there is a problem that the optical axes of the two imaging optical systems are deviated in accordance with the zoom position. It is extremely difficult to mechanically adjust the optical axes to prevent the optical axis deviation throughout the entire zoom range.

Conventionally, to solve the problem, a stereoscopic imaging apparatus is proposed, the apparatus including storage means for storing an optical axis deviation of two imaging optical systems for each zoom position, wherein a corresponding optical axis deviation is read out from the storage means according to the zoom position of the imaging optical systems during imaging, and coordinates of one of left and right images taken based on the Patent Literature 2 discloses a stereoscopic imaging apparatus including: a first lens barrel that includes a CCD for obtaining imaging information for right eye; a second lens barrel including a CCD for obtaining imaging information for left eye; a camera detection circuit that detects focal lengths of the first lens barrel and the second lens barrel; a ROM that stores in advance an amount of deviation of optical axis centers of the first lens barrel and the second lens barrel at each focal length and that is constituted by an EEPROM or the like; and a CPU that controls an image cut-out area of at least one of the pair of left and right CCDs at each focal length based on an output from the ROM.

CITATION LIST

Patent Literature

PTL 1: Japanese Patent Application Laid-Open No. 2006-162991
PTL 2: Japanese Patent Application Laid-Open No. 8-317424

SUMMARY OF INVENTION

Technical Problem

Patent Literatures 1 and 2 disclose techniques for correcting the optical axis deviation due to the individual differences between two imaging optical systems by converting the coordinates of one of the left and right images based on the amount of optical axis deviation acquired in advance for each zoom position or by changing the cut-out range of the image.

However, even if the optical axis deviation of the two imaging optical systems is corrected by converting the coordinates of the taken images or by adjusting the cut-out range of the image as in the inventions described in Patent Literatures 1 and 2, there is a problem that the optical axes of the two imaging optical systems are deviated if the focus position of the focus lenses change.

The present invention has been made in view of the circumstances, and an object of the present invention is to provide a stereoscopic imaging apparatus that can excellently correct an optical axis deviation of a plurality of imaging optical systems regardless of a subject distance (focus position) and that can obtain a plurality of images that allow easy stereoscopic vision.

Solution to Problem

To attain the object, a first aspect of the present invention provides a stereoscopic imaging apparatus including: a plurality of imaging units that include imaging optical systems and imaging elements for photoelectrically converting subject images formed through the imaging optical systems and that image a plurality of images with a parallax; a storage unit that stores amounts of optical axis deviation of the imaging optical systems with respect to a plurality of focus positions detected in advance; a focus position detection unit that detects current focus positions of the plurality of imaging optical systems; an optical axis deviation acquisition unit that acquires amounts of optical axis deviation corresponding to the current focus positions of the imaging optical systems detected by the focus position detection unit based on the amounts of optical axis deviation of the imaging optical systems; an imaging control unit that acquires a plurality of images for stereoscopic image from the plurality of imaging units; and an image cut-out unit that performs a cut-out process of images for stereoscopic display from the plurality of images acquired by the imaging control unit, based on the amounts of optical axis deviation acquired corresponding to the current focus position by the optical axis deviation acquisition unit.

According to the first aspect of the present invention, the optical axis deviation acquisition unit acquires the amounts of optical axis deviation corresponding to the current focus position, and the cut-out process of image for stereoscopic display is applied to the plurality of images based on the acquired amounts of optical axis deviation. Therefore, the optical axis deviation of the plurality of imaging optical systems can be excellently corrected regardless of the focus position (subject distance), and a plurality of images that allow easy stereoscopic vision can be obtained.

According to a second aspect of the present invention, in the stereoscopic imaging apparatus according to the first aspect, the storage unit stores, as the amounts of optical axis deviation of the imaging optical systems, amounts of optical axis deviation at respective focus positions of the imaging optical systems in accordance with the focus positions, and the optical axis deviation acquisition unit comprises a reading unit that reads out a corresponding amount of optical axis deviation from the storage unit based on the current focus position.

According to a third aspect of the present invention, in the stereoscopic imaging apparatus according to the first aspect, the storage unit stores, as the amounts of optical axis deviation of the imaging optical systems, information indicating the amounts of optical axis deviation at two or more focus positions or a formula, for calculating the amounts of optical axis deviation at the focus positions of the imaging optical systems, and the optical axis deviation acquisition unit comprises a calculation unit that calculates the amount of optical axis deviation based on the information stored in the storage unit and the current focus position.

The amount of optical axis deviation corresponding to the current focus position is read out from the storage unit according to the second aspect of the present invention, while the amount of optical axis deviation is calculated by computation according to the third aspect of the present invention.

According to a fourth aspect of the present invention, the stereoscopic imaging apparatus according to the first aspect further including a zoom position detection unit that detects a current zoom position of the plurality of imaging optical systems, wherein the storage unit further stores the amounts of optical axis deviation of the imaging optical systems with respect to a plurality of zoom positions detected in advance.

An optical axis deviation of a plurality of imaging optical systems is generated by the zoom position in addition to the focus position of the imaging optical systems. Therefore, the amounts of optical axis deviation are stored in advance in the storage unit in accordance with the focus positions and the zoom positions, and based on the current zoom position and focus position at the time of photographing, the corresponding amount of optical axis deviation is read out from the storage unit. As a result, the optical axis deviation of the plurality of imaging optical systems can be excellently corrected regardless of the focus position (subject distance) and the zoom position (imaging magnification), and a plurality of images that allow easy stereoscopic vision can be obtained.

According to a fifth aspect of the present invention, in the stereoscopic imaging apparatus according to the fourth aspect, the storage unit stores, as the amounts of optical axis deviation of the imaging optical systems, amounts of optical axis deviation at respective focus positions and respective zoom positions of the imaging optical systems, in accordance with the zoom positions and the focus positions, and the optical axis deviation acquisition unit comprises a reading unit that reads out a corresponding amount of optical axis deviation from the storage unit based on the current zoom position and focus position.

According to a sixth aspect of the present invention, in the stereoscopic imaging apparatus according to the fourth aspect, the storage unit stores, as the amounts of optical axis deviation of the imaging optical systems, information indicating the amounts of optical axis deviation at two or more focus positions or a formula, for calculating the amounts of optical axis deviation at the focus positions of the imaging optical systems, in accordance with the zoom positions of the imaging optical systems, and the optical axis deviation acquisition unit comprises a calculation unit that calculates the amount of optical axis deviation based on the information, which is read out from the storage unit based on the current zoom position of the imaging optical systems, and current focuses.

According to a seventh aspect of the present invention, the stereoscopic imaging apparatus according to any of the first to sixth aspects includes a distortion correction unit that corrects distortion of the plurality of images acquired by the imaging control unit based on a predetermined distortion correction formula, and the optical axis deviation acquisition unit acquires the amount of optical axis deviation after the distortion correction based on the predetermined distortion correction formula.

When the distortion correction is applied to the images acquired from the plurality of imaging units, the optical axis centers are deviated by the distortion correction. Therefore, the amount of optical axis deviation after the distortion correction is acquired, and the cut-out process of image for stereoscopic display is applied to the plurality of images based on the acquired amount of optical axis deviation. As a result, even if the distortion correction is performed, the optical axis deviation can be corrected without being affected by the distortion correction.

According to an eighth aspect of the present invention, the stereoscopic imaging apparatus according to the seventh aspect includes a distortion correction formula acquisition unit that acquires the predetermined distortion correction formula corresponding to a current zoom position from distortion correction formulas corresponding to zoom positions of the imaging optical systems. More specifically, since the distortion changes by the zoom position of the imaging optical systems, the distortion correction formula for correcting the distortion corresponding to the current zoom position is acquired.

According to a ninth aspect of the present invention, the stereoscopic imaging apparatus according to the eighth aspect further includes a zoom position detection unit that detects the current zoom position of the plurality of imaging optical systems, and the distortion correction formula acquisition unit includes: a storage unit that stores distortion correction formulas corresponding to the zoom positions of the imaging optical systems in accordance with the zoom positions; and a reading unit that reads out a corresponding distortion correction formula from the storage unit based on the current zoom position.

According to a tenth aspect of the present invention, in the stereoscopic imaging apparatus according to any of the seventh to ninth aspects, the optical axis deviation acquisition unit includes: a storage unit that stores the amounts of optical axis deviation before the distortion correction; and a calculation unit that assigns the amount of optical axis deviation read out from the storage unit to the predetermined distortion correction formula to calculate an amount of optical axis deviation after the distortion correction.

According to an eleventh aspect of the present invention, the stereoscopic imaging apparatus according to any of the seventh to tenth aspects further includes a shading correction unit that corrects shading of the plurality of images acquired by the imaging control unit, and the image cut-out unit applies the cut-out process of image to the images which has subjected to the shading correction by the shading correction unit. The cut-out process of image is executed after the brightness of the plurality of images is equalized by the shading correction. Therefore, images without a difference in the brightness between the cut out plurality of images can be formed.

According to a twelfth aspect of the present invention, in the stereoscopic imaging apparatus according to any of the seventh to eleventh aspects, the image cut-out unit applies the cut-out process of image to the images after the distortion correction by the distortion correction unit. This enables to cut-out images without deviation caused by the distortion between the cut-out images regardless of the cut-out ranges of the images.

According to a thirteenth aspect of the present invention, the stereoscopic imaging apparatus according to the eleventh or twelfth aspect includes: a unit that selects a continuous photographing mode for acquiring a preset number of time-series images from the plurality of imaging units or acquiring a plurality of images during a photographing instruction period; and an internal storage unit that temporarily stores images photographed in the continuous photographing mode, wherein the shading correction unit reads out the plurality of images stored in the internal storage unit after the completion of photographing in the continuous photographing mode to perform the shading correction.

According to a fourteenth aspect of the present invention, the stereoscopic imaging apparatus according to any of the seventh to tenth aspects, includes: a mode selection unit that selects a photographing mode or a reproduction mode; and a recording unit that records, in a recording medium, the plurality of images acquired by the imaging control unit during the photographing mode selected by the mode selection unit as well as the distortion correction formula acquired by the distortion correction formula acquisition unit and the amount of optical axis deviation acquired by the optical axis deviation acquisition unit in association with the plurality of acquired images, wherein the distortion correction unit and the image cut-out unit read out the plurality of images from the recording medium in the reproduction mode selected by the mode selection unit as well as the distortion correction formula and the amount of optical axis deviation stored in association with the images and apply the distortion correction, and apply the cut-out process of image to the read out plurality of images based on the distortion correction formula and the amount of optical axis deviation. The distortion correction and the cut-out process of image are not performed during the photographing, but are performed during the reproduction. As a result, the amount of processing during the photographing can be reduced, and particularly, a high-definition 3D moving image can be photographed and recorded at a high frame rate in the photographing of a three-dimensional (3D) moving image.

According to a fifteenth aspect of the present invention, in the stereoscopic imaging apparatus according to the fourteenth aspect, the recording unit records, in the recording medium, the images which have subjected to the distortion correction and the cut-out process of image in the reproduction mode.

According to a sixteenth aspect of the present invention, the stereoscopic imaging apparatus according to any of the first to fifteenth aspects includes a parallax adjustment unit that adjusts the amount of parallax between the plurality of images outputted from the plurality of imaging units, wherein the image cut-out unit further applies the cut-out process of images in which a cut-out position is adjusted based on the amount of parallax adjusted by the parallax adjustment unit, at a time of the cut-out process of image for stereoscopic display.

Advantageous Effects of Invention

According to the present invention, amounts of optical axis deviation which are registered in advance at an optical axis adjustment and are corresponding to a focus position (subject distance) of a plurality of imaging optical systems are acquired, and images for stereoscopic vision are cut out from the images based on the amounts of optical axis deviation. Therefore, a plurality of images that allow easy stereoscopic vision without an optical axis deviation between images for stereoscopic vision can be obtained regardless of the focus position (subject distance).

BRIEF DESCRIPTION OF DRAWINGS

FIG. 3 is a flow chart showing a first embodiment of a process at an optical axis adjustment before shipment according to the present invention.

FIG. 4 is a diagram showing a first example of a table recorded in an EEPROM at the optical axis adjustment before shipment.

FIG. 7 is a diagram showing a third example of the table recorded in the EEPROM at the optical axis adjustment before shipment.

FIG. 10A is a diagram showing a fourth example of the table recorded in the EEPROM at the optical axis adjustment before shipment.

FIG. 10B is a diagram showing the fourth example of the table recorded in the EEPROM at the optical axis adjustment before shipment.

FIG. 10C is a diagram showing the fourth example of the table recorded in the EEPROM at the optical axis adjustment before shipment.

DESCRIPTION OF EMBODIMENTS

Hereinafter, embodiments of a stereoscopic imaging apparatus according to the present invention will be described with reference to the attached drawings.

[Appearance of Stereoscopic Imaging Apparatus]

Figure 1A:
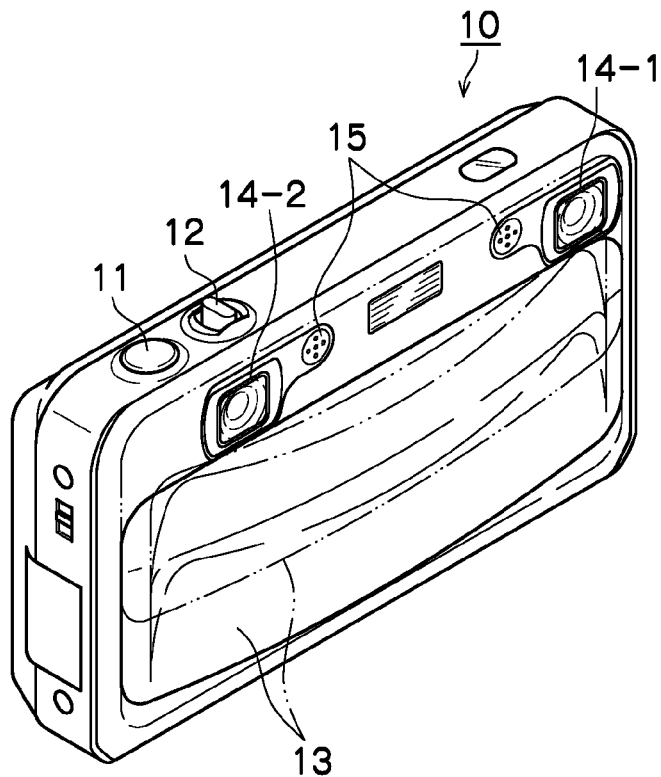
FIG. 1A is a perspective view of an appearance of a stereoscopic imaging apparatus from a front side according to the present invention.
Figure 1B:
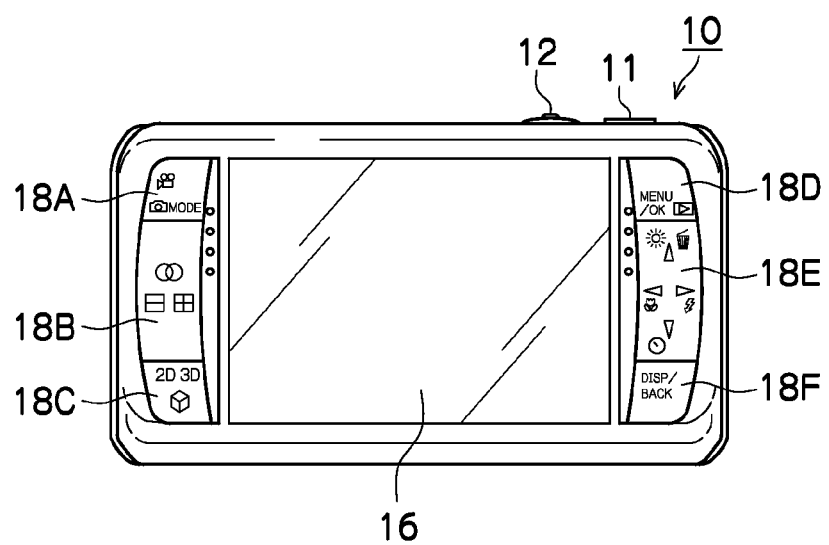
FIG. 1B is a diagram of an appearance of the stereoscopic imaging apparatus from a back side according to the present invention.

FIGS. 1A and 1B are diagrams showing appearances of the stereoscopic imaging apparatus according to the present invention. FIG. 1A shows a perspective view of the stereoscopic imaging apparatus from a front side, and FIG. 1B shows a rear view.

The stereoscopic imaging apparatus (compound-eye camera) 10 is a digital camera that can record and reproduce 2D/3D still images and 2D/3D moving images. As shown in FIGS. 1A and 1B, a shutter button 11 and a zoom button 12 are arranged on an upper surface of a thin rectangular-solid camera main body.

A lens barrier 13 with substantially the same width as the width in a horizontal direction of the camera main body is arranged on the front side of the camera main body, the lens barrier 13 being movable in a vertical direction of the camera main body. Front sides of a pair of left and right imaging optical systems 14-1 and 14-2 can be opened and closed at the same time by moving the lens barrier 13 in the vertical direction between a position illustrated by a two-dot chain line and a position illustrated by a solid line. Zoom lenses of a refractive optical system are used as the imaging optical systems 14-1 and 14-2. The power of the camera can be turned on/off in conjunction with open/close operations of the front side of the lens by the lens barrier 13.

As shown in FIG. 1B, a liquid crystal monitor 16 for 3D is arranged at a center section on the back side of the camera main body. The liquid crystal monitor 16 can display a plurality of parallax images (images for right eye and images for left eye) as directional images with predetermined directivities based on a parallax barrier. A lenticular lens can be used for the liquid crystal monitor 16 for 3D, or special glasses, such as polarizing glasses and liquid crystal shutter glasses, can be applied to separately view the images for right eye and the images for left eye.

Various operation switches are arranged on the left and right of the liquid crystal monitor 16. An operation switch 18A is a switch for switching still image photographing and moving image photographing. An operation switch 18B is a parallax adjustment switch for adjusting an amount of parallax between the image for right eye and the image for left eye. An operation switch 18C is a switch for switching 2D photographing and 3D photographing. An operation switch 18D is a seesaw key serving as a MENU/OK button and a reproduction button. Operation switches 18E are multi-function cross keys. An operation switch 18F is a DISP/BACK key.

The MENU/OK button is an operation switch that has a function of a menu button for instructing display of a menu on the screen of the liquid crystal monitor 16 and a function of an OK button for instructing confirmation, execution, and the like of a selection. The reproduction button is a button for switching from a photographing mode to a reproduction mode. The cross keys are operation switches for inputting instructions in vertical and horizontal four directions, and a macro button, a flash button, a self-timer button, and the like are allocated. When the menu is selected, the cross keys function as switches (cursor movement operation unit) for instructing selection of an item from the menu screen or selection of various setting items from each menu. Left/right keys of the cross keys function as frame advancing (advancing in forward direction/backward direction) buttons in the reproduction mode. The DISP/BACK key is used to switch the display mode of the liquid crystal monitor 16, cancel the instruction on the menu screen, or restore the previous operation state.

In FIG. 1A, reference numeral 15 denotes a stereo microphone.

[Internal Configuration of Stereoscopic Imaging Apparatus]

Figure 2:
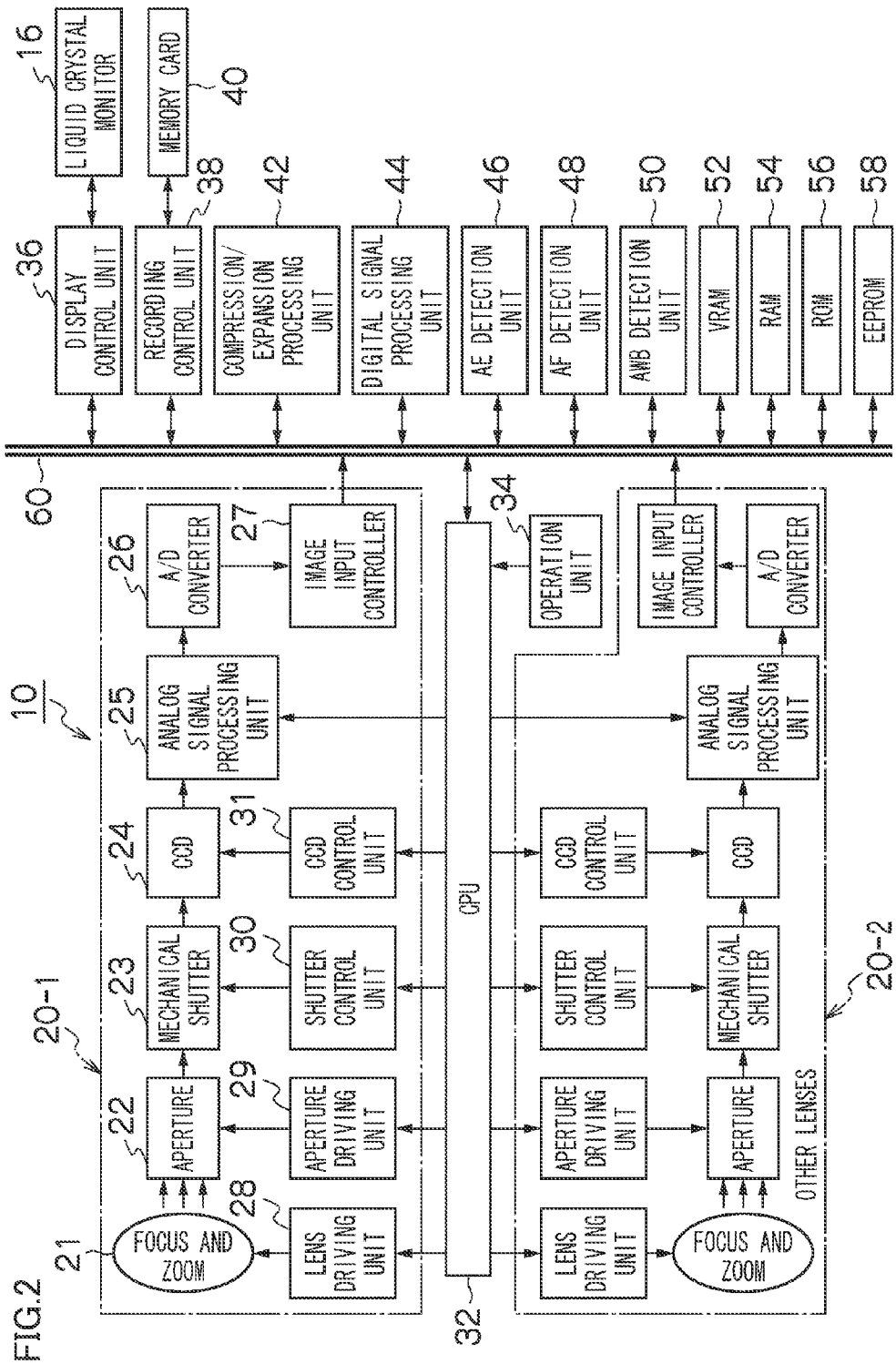
FIG. 2 is a block diagram showing an embodiment of the stereoscopic imaging apparatus according to the present invention.

FIG. 2 is a block diagram showing an embodiment of the stereoscopic imaging apparatus 10.

As shown in FIG. 2, the stereoscopic imaging apparatus 10 mainly includes a plurality of imaging units 20-1 and 20-2, a central processing unit (CPU) 32, the shutter button 11, the zoom button 12, an operation unit 34 including various operation switches, a display control unit 36, the liquid crystal monitor 16, a recording control unit 38, a compression/expansion processing unit 42, a digital signal processing unit 44, an AE (Automatic Exposure) detection unit 46, an AF (Auto Focus) detection unit 48, an AWB (Automatic White Balance) detection unit 50, a VRAM 52, a RAM 54, a ROM 56, an EEPROM 58, and the like. Although the imaging units 20-1 and 20-2 take two parallax images composed of an image for left eye and an image for right eye each having a parallax with each other, there may be three or more imaging units 20.

The imaging unit 20-1 that takes an image for left eye includes a prism (not shown), the imaging optical system 14-1 (FIGS. 1A and 1B) including focus and zoom lenses 21, an optical unit including an aperture 22 and a mechanical shutter 23, a solid-state imaging element (CCD) 24, an analog signal processing unit 25, an A/D converter 26, an image input controller 27, a lens driving unit 28 that drives the optical unit, an aperture driving unit 29, a shutter control unit 30, and a CCD control unit 31 that controls the CCD 24. The configuration of the imaging unit 20-2 that takes an image for right eye is the same as that of the imaging unit 20-1 that takes an image for left eye, and the specific configuration will not be described.

The CPU 32 administers and controls operation of the entire camera in accordance with predetermined control programs based on input from the operation unit 34. The ROM 56 stores the control programs executed by the CPU 32 and various data necessary for the control. The EEPROM 58 stores various pieces of information indicating a result of adjustment in the adjustment before shipment of the product, such as pixel defect information of the CCD 24 as well as correction parameters and tables used for image processing and the like. Details of various pieces of information stored here will be described later.

The VRAM 52 is a memory that temporarily stores image data for display displayed on the liquid crystal monitor 16. The RAM 54 includes a calculation operation area of the CPU 32 and a temporary storage area of image data.

The focus and zoom lenses 21 included in the imaging optical system are driven to move back and forth along the optical axis by the lens driving unit 28. The CPU 32 controls the drive of the lens driving unit 28 to control the position of the focus lens to adjust the focus to focus the subject and to control the zoom position of the zoom lens according to a zoom instruction from the zoom button 12 in the operation unit 34 to change the zoom magnification.

The aperture 22 is constituted by, for example, an iris aperture, and the aperture driving unit 29 drives and operates the aperture 22. The CPU 32 controls the amount of opening (aperture value) of the aperture 22 through the aperture driving unit 29 and controls the amount of incident light to the CCD 24.

The mechanical shutter 23 opens and closes the optical path to determine the exposure time in the CCD 24 and prevents unnecessary light from entering the CCD 24 during reading of an image signal from the CCD 24 to prevent the generation of smear. The CPU 32 outputs, to the shutter control unit 30, a shutter closing signal in synchronization with the end of exposure corresponding to the shutter speed to control the mechanical shutter 23.

The CCD 24 is constituted by a two-dimensional color CCD solid-state imaging element. A multiplicity of photodiodes are two-dimensionally arranged on the light receiving surface of the CCD 24, and color filters in a predetermined array are arranged on the photodiodes.

The photodiodes convert an optical image of the subject, which is formed on the CCD light receiving surface through the optical unit configured as described above, into signal charges according to the amount of incident light. The signal charges accumulated on the photodiodes are sequentially read out from the CCD 24 as voltage signals (image signals) corresponding to the signal charges based on a drive pulse provided from the CCD control unit 31 in accordance with an instruction of the CPU 32. The CCD 24 has an electronic shutter function and controls the exposure time (shutter speed) by controlling the time of charge accumulation on the photodiodes. The electronic shutter controls the charge accumulation start time corresponding to the shutter speed and closes the mechanical shutter 23 to control the exposure end time (charge accumulation end time). In the embodiment, although the CCD 24 is used as an imaging element, imaging elements in other configurations, such as a CMOS sensor, can also be used.

The analog signal processing unit 25 applies correlated double sampling (CDS) to R, G, B analog signals read out from the CCD 24 or amplifies the R, G, B analog signals, and the A/D converter 26 converts the R, G, B analog signals to R, G, B digital signals.

The image input controller 27 includes a line buffer with a predetermined capacity and temporarily accumulates the R, G, B image signals (CCDRAW data) subjected to A/D conversion by the A/D converter 26 to store the signals in the RAM 54 through a bus 60.

In a 3D photographing mode, the CPU 32 controls the imaging unit 20-2 that takes an image for right eye in the same way as for the imaging unit 20-1 that takes an image for left eye.

The AE detection unit 46 calculates a subject luminance necessary for the AE control based on an image signal imported during the half-press of the shutter button 11 and outputs a signal indicating the subject luminance (photographing EV value) to the CPU 32. The CPU 32 sets the shutter speed (exposure time), the aperture value, and the imaging sensitivity in the plurality of imaging units 20-1 and 20-2 in accordance with a predetermined program chart based on the inputted imaging EV value.

The AF detection unit 48 integrates absolute values of high frequency components of the image signal in the AF area imported during the half-press of the shutter button 11 and outputs the integrated value (AF evaluation value) to the CPU 32. The CPU 32 moves the focus lens from the near side to the infinity side to search a focus position with the maximum AF evaluation value detected by the AF detection unit 48 and moves the focus lens to the focus position to adjust the focus to the subject (main subject). During moving image photographing, a so-called hill-climbing control, which is for moving the focus lens to always set the AF evaluation value to the maximum value, is performed.

The AWB detection unit 50 automatically obtains the light source type (color temperature of the field) based on the R, G, B image signals acquired during the imaging and reads out a corresponding white balance gain from a table that stores R, G, B white balance gains (white balance correction values) set in advance by the light source type.

The digital signal processing unit 44 includes a white balance correction circuit, a gradation conversion processing circuit (for example, gamma correction circuit), a synchronization circuit that interpolates spatial deviation of R, G, B color signals associated with the color filter arrangement of the single-plate CCD to match the positions of the color signals, a contour correction circuit, a luminance/color difference signal generation circuit, and the like and applies image processing to the R, G, B image signals (CCDRAW data) stored in the RAM 54. More specifically, the digital signal processing unit 44 multiplies the R, G, B CCDRAW data by the white balance gain detected by the AWB detection unit 50 to correct the white balance and executes a predetermined process, such as a gradation conversion process (for example, gamma correction), to convert the data to a YC signal including a luminance signal (Y signal) and color difference signals (Cr, Cb signals). The YC signal processed by the digital signal processing unit 44 is stored in the RAM 54.

The digital signal processing unit 44 also includes a distortion correction circuit that corrects a lens distortion of the imaging optical systems of the plurality of imaging units 20-1 and 20-2 and an image cut-out processing circuit that cuts out images of predetermined cutting areas from the left and right viewpoint images to correct an optical axis deviation of the imaging optical systems of the plurality of imaging units 20-1 and 20-2. Details of the processes of the distortion correction circuit and the image cut-out processing circuit will be described later.

The compression/expansion processing unit 42 compresses the YC signal stored in the RAM 54 in accordance with an instruction from the CPU 32 during recording to the memory card 40 and expands the compressed data compressed and recorded in the memory card 40 to convert the data to the YC signal. The recording control unit 38 converts the compressed data compressed by the compression/expansion processing unit 42 to an image file in a predetermined format (for example, an image file in an MP (Multi Picture) format for 3D still images and a moving image file of motion JPEG, H.264, MPEG4, MPEG4-MVC for 3D moving image) to record the image file in the memory card 40 or read out the image file from the memory card 40.

The liquid crystal monitor 16 is used as an image display unit for displaying photographed images and is used as a GUI (Graphical User Interface) during various settings. The liquid crystal monitor 16 is also used as an electronic viewfinder that displays a live view image (hereinafter, called "through image") for checking the angle of view in the photographing mode. To display 3D images on the liquid crystal monitor 16, the display control unit 36 alternately displays an image for left eye and an image for right eye held by the VRAM 52 pixel by pixel. Based on the parallax barrier arranged on the liquid crystal monitor 16, left and right eyes of the user who observes the images from a predetermined distance separately view the left and right images alternately arranged pixel by pixel. This allows a stereoscopic vision.

Although not illustrated in FIG. 2, the stereoscopic imaging apparatus 10 also has a function of recording and reproducing audio information (audio data) acquired by the stereo microphone 15 shown in FIGS. 1A and 1B.

[First Embodiment of Optical Axis Adjustment before Shipment of Product]

Next, information for optical axis adjustment stored in the EEPROM 58 at an adjustment before shipment of the product will be described.

FIG. 3 is a flow chart showing a first embodiment of a process at an optical axis adjustment before shipment according to the present invention.

As shown in FIG. 3, a variable N indicating the focus position of the focus lens is first set to N=Near (nearest end) (step S10). The variable N changes in accordance with the focus position between Near (for example, 1) indicating the nearest end and Inf (for example, n) indicating the infinity.

Subsequently, the stereoscopic imaging apparatus 10 to be adjusted and an adjustment chart for adjusting the optical axis are set to form a predetermined positional relationship, and the focus lenses of the imaging optical systems of the stereoscopic imaging apparatus 10 are adjusted to focus the adjustment chart (step S12). The adjustment chart is first set to a subject distance corresponding to the nearest end (Near).

Subsequently, the focus lenses are moved to focus the adjustment chart, and images are taken at the lens position (focus position) to acquire left and right images (steps S14 and S16).

Corresponding point detection for detecting corresponding feature points from the acquired left and right images is performed (step S18). For example, a block matching method can be applied as the method of detecting the corresponding points. More specifically, the degree of coincidence between a block in a predetermined block size cut out with reference to (on the basis of) an arbitrary pixel from the left image and the blocks of the right image is evaluated, and a reference pixel of a block in the right image with the maximum degree of coincidence between blocks is determined as a pixel of the right image corresponding to the arbitrary pixel of the left image. An example of the function for evaluating the degree of coincidence between blocks in the block matching method includes a use of a sum of squared difference (SSD) of a luminance difference between pixels in the blocks (SSD block matching method).

When the corresponding points are detected, an amount of deviation between the corresponding points (average of the amounts of deviation of a plurality of corresponding points if a plurality of corresponding points are detected) is detected, and the detected amount of deviation is set as an amount of optical axis deviation between two imaging optical systems to store the amount in the EEPROM 58 in association with a focus position N (steps S20 and S22).

Whether N reaches Inf(n) is determined (step S24). If "No", the variable N is incremented by 1 (step 26), and the process moves to step S12. The adjustment chart is moved to the subject distance corresponding to the variable N, and the process (step S12 to S24) is executed. Meanwhile, if "Yes", the adjustment process ends (step S28).

In this way, as a result of imaging the adjustment chart while changing the focus position of the focus lenses to detect the amount of optical axis deviation, the amount of optical axis deviation corresponding to each focus position FN (N=1, 2, . . . , n) is stored in the EEPROM 58 as shown in FIG. 4. The amount of optical axis deviation shown in FIG. 4 denotes an amount of deviation in a vertical (V) direction of the coordinate value at the optical axis center of one of the left and right images (for example, right image) relative to the coordinate value of the optical axis center of the other image (left image).

[First Embodiment of Photographing Operation]

Next, a photographing operation of a first embodiment of the stereoscopic imaging apparatus 10 according to the present invention will be described with reference to a flow chart shown in FIG. 5.

Figures 5, 6:
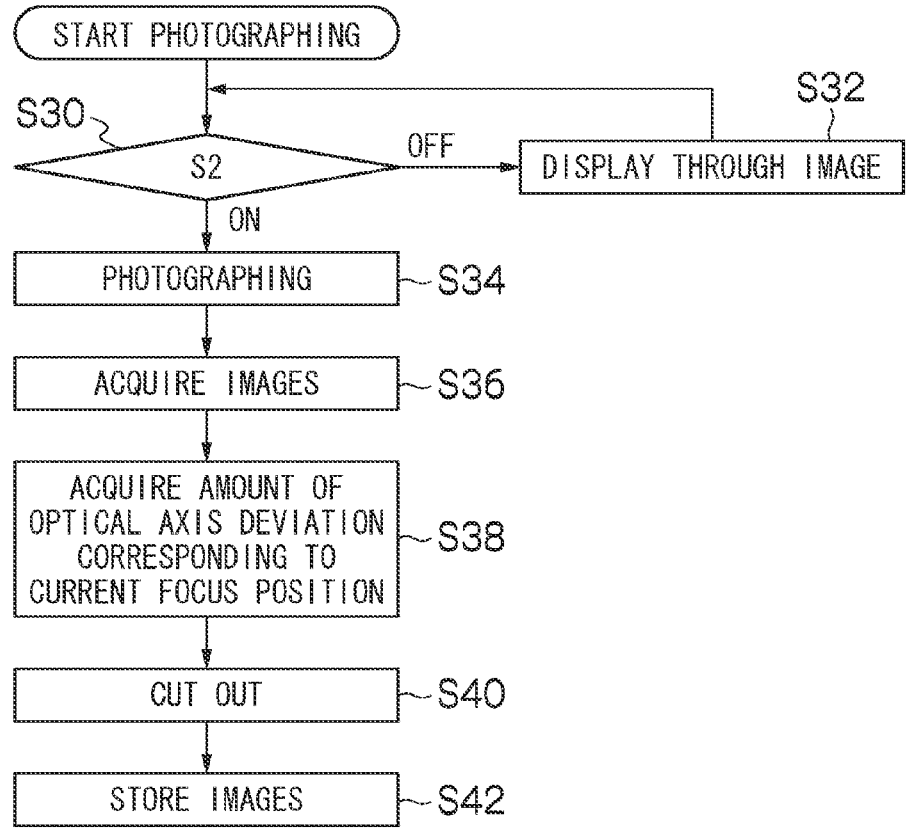
FIG. 5 is a flow chart showing a photographing operation of a first embodiment of the stereoscopic imaging apparatus according to the present invention.
FIG. 6 is a diagram showing a second example of the table recorded in the EEPROM at the optical axis adjustment before shipment.

In FIG. 5, the CPU 32 determines the presence of a photographing instruction (full-press of the shutter button 11 (ON of a switch S2) (step S30). If the switch S2 is OFF, a 3D through image is displayed on the liquid crystal monitor 16 (step S32).

To display the 3D through image, the amount of optical axis deviation in the left and right images corresponding to the current focus position is read out from the table shown in FIG. 4 with respect to the left and right images sequentially acquired in a time-series manner from the left and right imaging units 20-1 and 20-2, and an image for 3D through image is cut out from the image of the full angle of view so as to offset the amount of optical axis deviation to output the image on the liquid crystal monitor 16.

As a result, a 3D through image, in which the optical axis deviation that is different at each focus position of the two imaging optical systems is corrected, can be displayed on the liquid crystal monitor 16.

On the other hand, when the switch S2 is turned ON, the CPU 32 starts the main photographing (step S34).

When left and right images of full angle of view are acquired by the main photographing (step S34), information of the current focus position of the focus lenses (for example, the number of pulses from reference position of the focus motor (step motor)) is acquired, and the amount of optical axis deviation corresponding to the acquired current focus position (F-pos) is read out from the EEPROM 48 (step S38).

Based on the read out amount of optical axis deviation, the left and right cut-out positions are moved by the amount of optical axis deviation to execute a cut-out process of image from the left and right images acquired in switch S36 (step S40). For example, if the amount of optical axis deviation is +2 (pixels), the cut-out center of the left image is shifted by +1 pixel in the V direction to cut out the left image, and the cut-out center of the right image is shifted by −1 pixel in the V direction to cut out the right image. As a result, the cut out images are images in which the optical axis deviation is corrected.

The cut out left and right images are compressed in a predetermined compression format and recorded in a file created in the memory card 40 (step S42).

If the imaging optical systems are single-focus lenses, the amount of optical axis deviation read out corresponding to the current focus position is used based on the amounts of optical axis deviation stored in advance for the focus positions as shown in FIGS. 3 and 4 to cut out the images. If the imaging optical systems are zoom lenses as in the embodiment, the amount of optical axis deviation is acquired for each zoom position and focus position of the zoom lenses.

More specifically, if the zoom positions of the zoom lenses include ten stages from a zoom position (Z1) at the wide end to a zoom position (Z10) at the telephoto end, the zoom lenses are moved to each zoom position to execute the process from step S10 to step S26 of FIG. 3 for each zoom position to store the amount of optical axis deviation at each zoom position and focus position in the EEPROM 58.

FIG. 6 is a second example of the table that stores the amount of optical axis deviation at each zoom position and focus position stored in the EEPROM 58.

In this case, the current zoom position and the focus position are acquired in step S38 of FIG. 5, and the amount of optical axis deviation corresponding to the acquired zoom position and focus position is read out from the table shown in FIG. 6.

As a result, left and right images for stereoscopic vision, in which the optical axis deviation is corrected, can be cut out regardless of the zoom position and the focus position of the left and right imaging optical systems.

Although the table shown in FIG. 6 stores amounts of optical axis deviation corresponding to all zoom positions and focus positions, the arrangement is not limited to this. As shown in FIG. 7, the amounts of optical axis deviations of only two focus positions (focus position of the near side (Near) and focus position of the infinity (Inf)) may be detected and stored, and the amounts of optical axis at intermediate focus positions may be calculated by linearly interpolating the amounts of optical axis at the two focus positions based on the intermediate focus positions.

If the zoom position is near the telephoto end and the movement of the focus lens is large, it is preferable to detect and store the amounts of optical axis deviation at three focus positions of near side, middle, and infinity to perform linear interpolation from the near side to the middle or from the middle to the infinity to calculate the amount of optical axis deviation.

[Distortion Correction]

Next, a case of applying, to the photographed left and right images, a distortion correction for correcting a distortion of images (such as barrel distortion and pincushion distortion) due to the lens distortion will be described.

There is a problem that the optical axes are deviated by a distortion correction when the distortion correction is applied to the left and right eyes.

Figure 8:
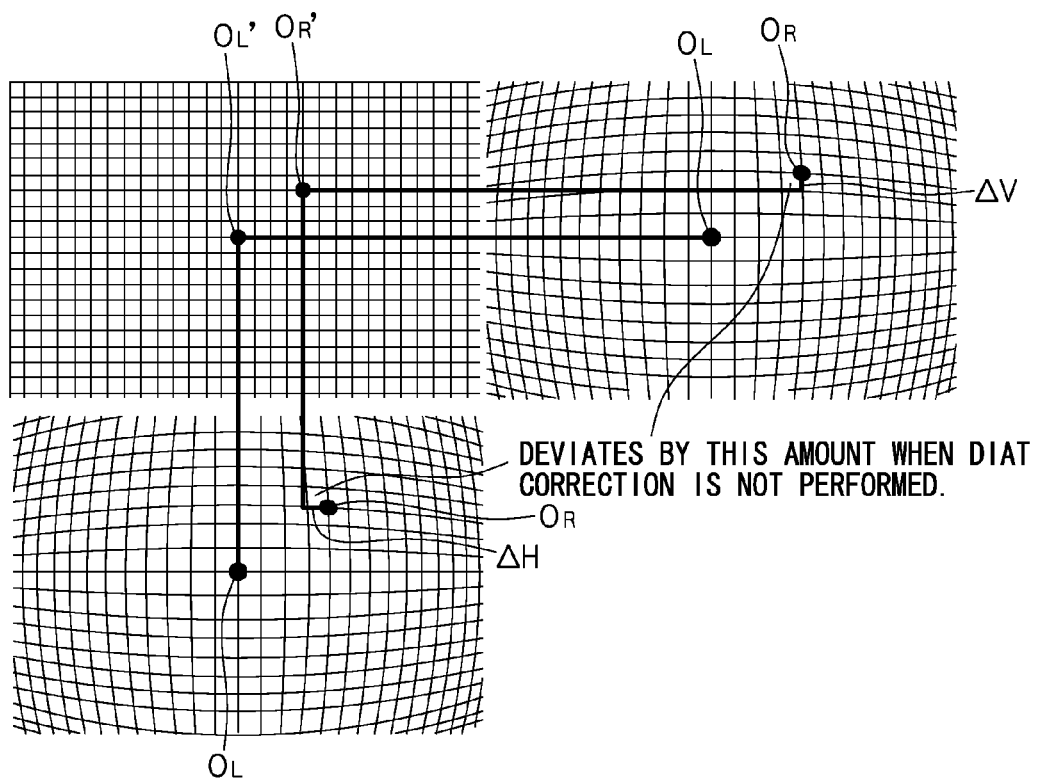
FIG. 8 is a diagram showing a deviation of optical axis centers of left and right images before and after distortion correction.

For example, assuming that the optical axis center of the left image with a barrel distortion is $O_L$ and the optical axis center of the right eye is $O_R$ as shown in FIG. 8, the optical axis centers after the distortion correction of the images are $O_L'$ and $O_R'$, respectively, and the optical axis centers are deviated by $\Delta H$ and $\Delta V$ in the horizontal and vertical directions.

The distortion correction is performed by assigning coordinate values of pixels to a distortion correction formula of a high-order polynomial for calculation. Therefore, there is a large amount of calculation, and for example, if the distortion correction is performed by using a distortion correction formula with high correction accuracy during 3D moving image photographing, there is a problem that it is difficult to take and record a high-definition (HD) 3D moving image at a high frame rate.

Therefore, in the case of 3D moving image, the distortion correction is not performed, or a low-order distortion correction formula is used to perform a distortion correction with low correction accuracy.

Meanwhile, the distortion correction of a 3D still image can be performed after photographing and before writing to the memory card. Therefore, a distortion correction formula with high correction accuracy can be used to perform a distortion correction with high correction accuracy.

If the distortion correction formulas with different correction accuracy are used for the 3D moving image and the 3D still image, there is a problem that the optical axis centers after the distortion correction are deviated in accordance with the distortion correction formula used.

A method of acquiring images without optical axis deviation even if distortion corrections with different correction accuracy are performed will be described in the following embodiment.

[Second Embodiment of Optical Axis Adjustment before Shipment of Product]

Figure 9:
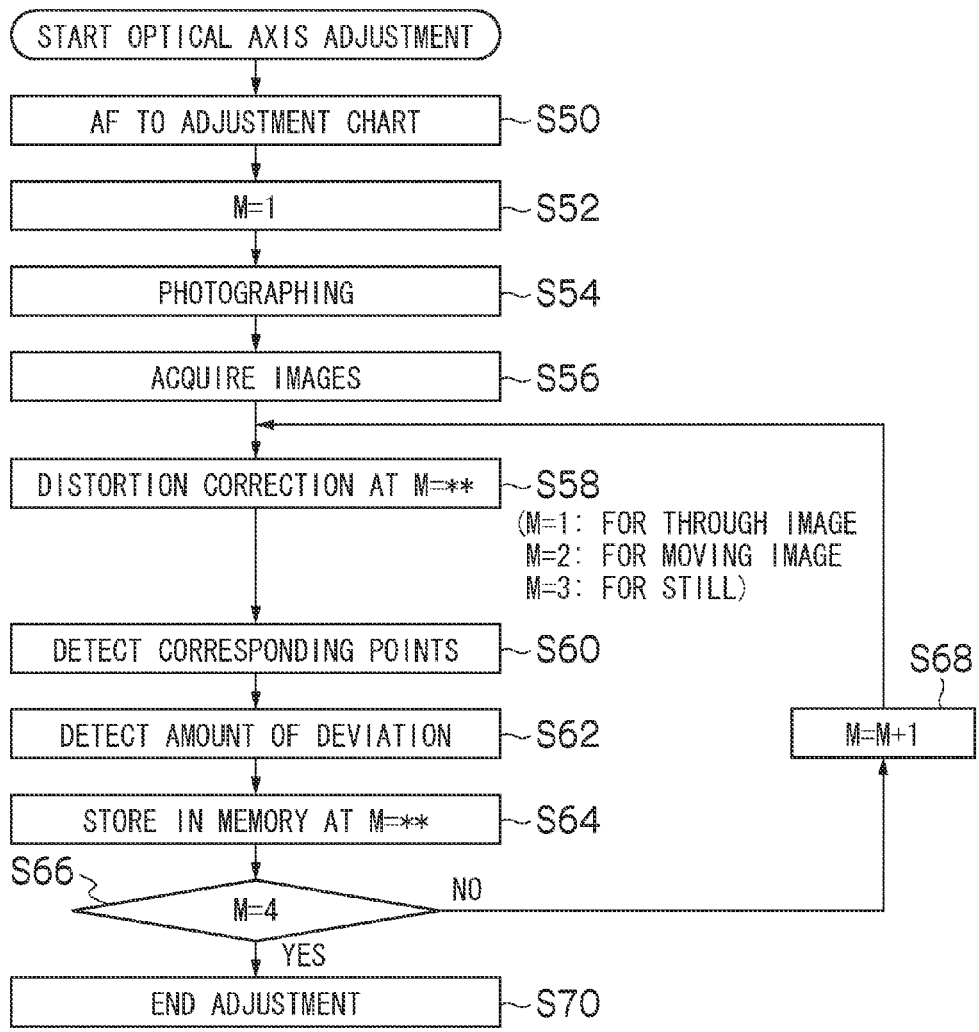
FIG. 9 is a flow chart showing a second embodiment of a process at the optical axis adjustment before shipment.

FIG. 9 is a flow chart showing a second embodiment of the process at the optical axis adjustment before shipment according to the present invention.

As shown in FIG. 9, the stereoscopic imaging apparatus 10 to be adjusted and an adjustment chart for adjusting the optical axis are set to form a predetermined positional relationship, and the focus position of the imaging optical systems of the stereoscopic imaging apparatus 10 are adjusted to focus the adjustment chart (step S50).

A variable M indicating the photographing mode is set to 1 (step S52). Here, N=1 denotes a photographing mode for displaying a 3D through image on the liquid crystal monitor 16, M=2 denotes a photographing mode for photographing a 3D moving image, and M=3 denotes a photographing mode for photographing a 3D still image.

Subsequently, the adjustment chart is photographed (taken), and left and right images are acquired (steps S54 and S56).

A distortion correction corresponding to the current photographing mode N is applied to the acquired left and right images (step S58). The correction accuracy of the distortion correction formula used here for performing the distortion correction is different depending on the photographing mode N. For example, a second-order polynomial is used in the photographing mode for through image (M=1), a fourth-order polynomial is used in the photographing mode for moving image (M=2), and a sixth-order polynomial is used in the photographing mode for still image (M=3). Although a distortion correction formula in higher order can perform a distortion correction with higher accuracy, the amount of calculation increases. Therefore, the correction accuracy and the amount of calculation are in a tradeoff relationship.

After the distortion correction in step S58, corresponding point detection for detecting corresponding feature points of left and right images is performed (step S60). For example, a block matching method can be applied as the detection method of the corresponding points.

When the corresponding points are detected, an amount of deviation between the corresponding points (if a plurality of corresponding points are detected, average of the amounts of deviation of the corresponding points) is detected, and the detected amount of deviation is set as an amount of optical axis deviation between two imaging optical systems to store the amount in the EEPROM 58 in association with the photographing mode M (steps S62 and S64).

Whether M=4 is determined (step S66). If "No", the variable M is incremented by one (step S68), and the process moves to step S58. If "Yes", the adjustment process ends (step S70).

As a result, the amounts of optical axis deviation (deviation amounts of optical axes) are stored in the EEPROM 58 for each photographing mode (M=1, 2, 3).

Although the detection and storage of the amounts of optical axis deviation when the zoom position and the focus position are changed are not described in FIG. 9, the amounts of optical axis deviation when the zoom position and the focus position are changed are also detected and stored for each photographing mode. A distortion correction formula corresponding to each zoom position is used for the distortion correction in step S58.

FIGS. 10A to 10C show examples of a table showing the amounts of optical axis deviation of each photographing mode stored in the EEPROM 58.

FIGS. 10A to 10C show a table for through image, a table for still image, and a table for moving image, respectively.

Each table stores the amounts of optical axis deviation (amounts of optical axis deviation in the V direction) with respect to the left and right images for each zoom position.

Only the amounts of optical axis deviation in the V direction are stored in the case of 3D image because the optical axis deviation in the V direction between images is a problem for the stereoscopic vision. However, the arrangement is not limited to this, and the amounts of optical axis direction in the horizontal (H) direction may also be stored.

The distortion correction formula for each photographing mode and each zoom position is also stored in the EEPROM 58. In this case, the same general formula of the distortion correction formula can be stored for each zoom position, and only a coefficient of each term is made different for each zoom position and stored. Alternatively, a different distortion correction formula can be stored for each zoom position.

The amount of optical axis deviation for each focus position is not illustrated in the tables of FIGS. 10A to 10C.

[Second Embodiment of Photographing Operation]

Next, a photographing operation of a second embodiment of the stereoscopic imaging apparatus 10 according to the present invention will be described with reference to a flow chart shown in FIG. 11.

A photographing mode for photographing a 3D moving image (hereinafter, called "3D moving image photographing mode") can be set by switching the mode to the moving image photographing mode by the operation switch 18A shown in FIG. 1B and switching the mode to the 3D photographing mode by the operation switch 18C. A photographing mode for photographing a 3D still image (hereinafter, called "3D still image photographing mode") can be set by switching the mode to the still image photographing mode by the operation switch 18A and switching the mode to the 3D photographing mode by the operation switch 18C.

In step S80, whether the 3D moving image photographing mode is set or the 3D still image photographing mode is set as a photographing mode by the operation switches 18A and 18C is determined.

If the photographing mode is determined to be the 3D moving image photographing mode, the CPU 32 determines the presence of an instruction of moving image photographing (full-press of the shutter button 11 (ON of switch S2)) (step S82). If the switch S2 is OFF, a 3D through image is displayed on the liquid crystal monitor 16 (step S84).

To display the 3D through image, the distortion correction formula for through image (second-order polynomial) is used to apply the distortion correction to the left and right images sequentially acquired in a time-series manner from the left and right imaging units 20-1 and 20-2. The amounts of optical axis deviation in the left and right images corresponding to the current zoom position of the zoom lenses are read out from the table for through image shown in FIG. 10A. Images for 3D through image are cut out from the images after the distortion correction so as to offset the amounts of optical axis deviation, and the images are outputted to the liquid crystal monitor 16.

As a result, a 3D through image, in which the optical axis deviation of the two imaging optical systems that are different at each zoom position and focus position is corrected, can be displayed on the liquid crystal monitor 16.

Meanwhile, if the switch S2 is turned ON, the CPU 32 starts photographing the 3D moving image (step S86).

When the photographing of the 3D moving image is started, the distortion correction, a distortion correction, imaging processing such as a cut-out process of image, and a recording process are applied to the left and right images sequentially acquired in a time-series manner from the left and right imaging units 20-1 and 20-2 (step S88).

[First Embodiment of Image Processing]

Figure 11:
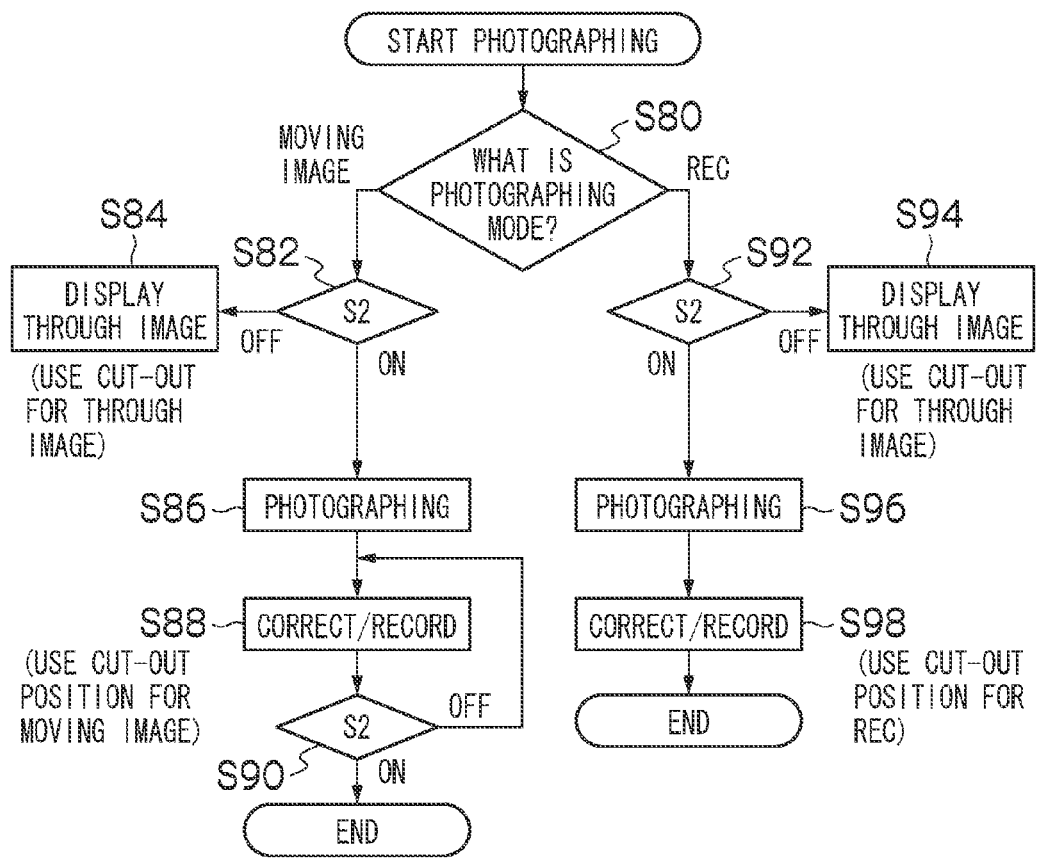
FIG. 11 is a flow chart showing photographing operations corresponding to photographing modes of the stereoscopic imaging apparatus according to the present invention.
Figure 12:
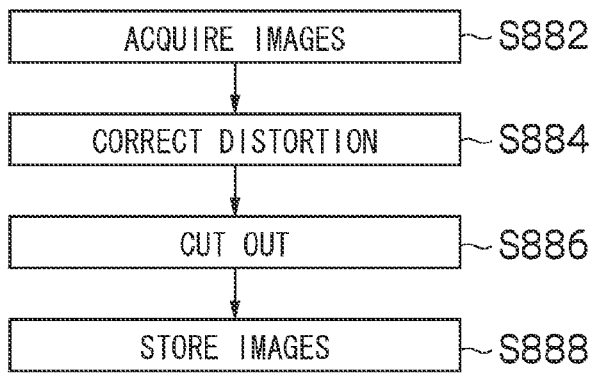
FIG. 12 is a flow chart showing a first embodiment of image processing shown in FIG. 11.

FIG. 12 is a flow chart showing a first embodiment of the image processing in step S88 of FIG. 11 and so forth.

In FIG. 12, when left and right images are acquired (step S882), the distortion correction circuit in the digital signal processing unit 44 uses a distortion correction formula, which is a distortion correction formula for moving image (fourth-order polynomial) and which corresponds to the current zoom position of the zoom lenses, to correct the distortion of the acquired left and right images (step S884).

Subsequently, the amounts of optical axis deviation corresponding to the current zoom position (Z-pos) and focus position are read out from the table for moving image of FIG. 10C, and the cut-out ranges are moved according to the amounts of optical axis deviation to execute a cut-out process of images from the left and right images in which the distortion is corrected based on the read out amounts of optical axis deviation (step S886). As a result, the cut out images are images in which the optical axis deviation is corrected.

The cut out left and right images are compressed in a predetermined compression format and recorded in a moving image file created in the memory card 40 (step S888). The recording process of moving image is executed every time image processing of a prescribed number of frames of one second (60 frames if the frame rate is 60 frames/second) is finished, and the compressed moving image is sequentially added to the moving image file. The audio data acquired by the stereo microphone 15 is also compressed every second and recorded in the moving image file.

Returning to FIG. 11, whether the switch S2 is turned ON is determined again (step S90). If the switch S2 is OFF, the process moves to step S88 to continue processing of the moving image. When the switch S2 is turned ON, the photographing of the 3D moving image is finished.

Meanwhile, if it is determined in step S80 that the mode is the 3D still image photographing mode, the CPU 32 determines the presence of an instruction (ON of the switch S2) of still image photographing (step S92). If the switch S2 is OFF, a 3D through image is displayed on the liquid crystal monitor 16 (step S94). The 3D through image is displayed on the liquid crystal monitor 16 as in step S84.

When the switch S2 is turned ON, the CPU 32 performs photographing of a 3D still image (step S96). As for the two-step stroke shutter button, it is obvious that a switch S1 is turned ON during the half-press before the full-press, and a photographing preparation operation before the main photographing, such as the AE process and the AF process, is performed.

As in step S88, the distortion correction, the image processing such as the cut-out process of images, and the recording process are applied to the left and right images acquired from the left and right imaging units 20-1 and 20-2 in the main photographing (step S98). The distortion correction formula of the sixth-order polynomial with high correction accuracy is used for the distortion correction in step S98, and the cut-out process of image is executed based on the amounts of optical axis deviation read out corresponding to the current zoom position and focus position from the table for still image of FIG. 10B.

[Third Embodiment of Optical Axis Adjustment before Shipment of Product]

Figure 13:
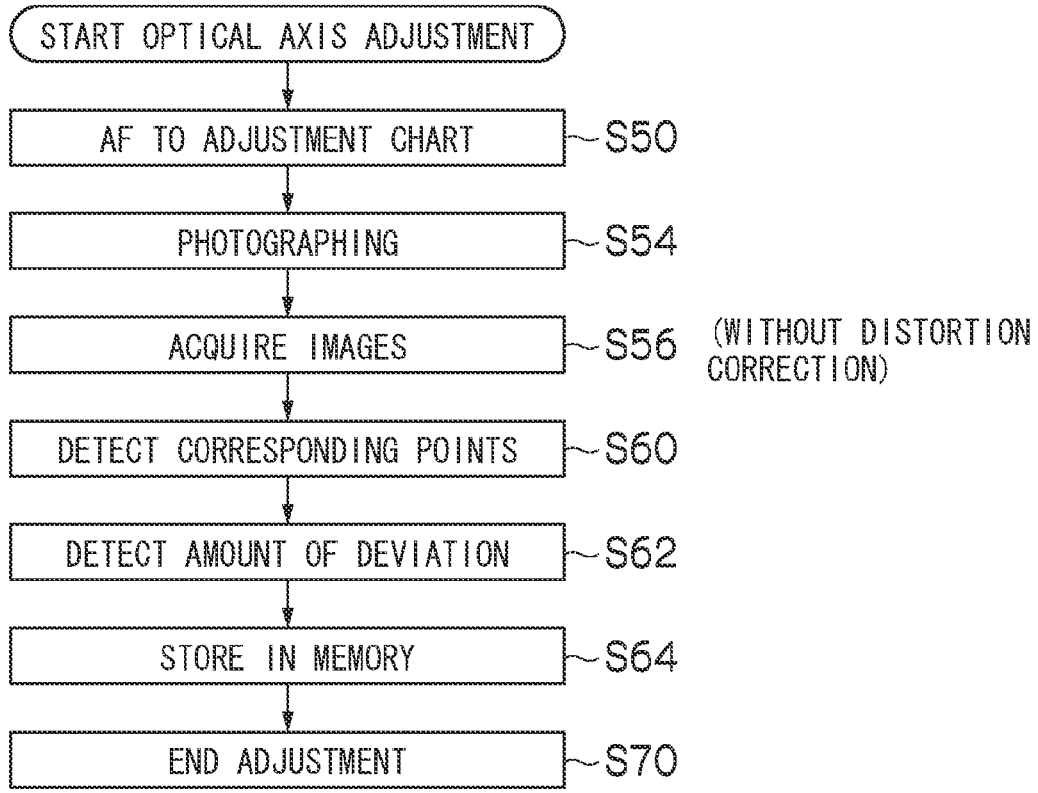
FIG. 13 is a flow chart showing a third embodiment of the process at the optical axis adjustment before shipment.

FIG. 13 is a flow chart showing a third embodiment of the process at the optical axis adjustment according to the present invention. Common parts with the second embodiment shown in FIG. 9 are designated with the same step numbers, and the detailed description will not be repeated.

The processes of steps S52, S58, S56, and S68 shown in FIG. 9 are omitted in the third embodiment shown in FIG. 13.

In the second embodiment shown in FIG. 9, the amount of optical axis deviation is detected for each photographing mode of through image, moving image, and still image and stored in the EEPROM 58 (see FIGS. 10A to 10C). In the third embodiment shown in FIG. 13, the corresponding points of the left and right images are detected to detect the amounts of optical axis deviation of the left and right images (steps S60 and S62) without performing the distortion correction for the left and right images acquired in step S56, and the detected amounts of optical axis deviation are stored in the EEPROM 48 (step S64). It is the same as in the embodiment shown in FIG. 9 that the amounts of optical axis deviation are stored in the EEPROM 48 for each zoom position and focus position of the zoom lenses.

More specifically, the amounts of optical axis deviation of the left and right images before the distortion correction are detected and recorded in the third embodiment shown in FIG. 13, and the amounts of optical axis deviation of each photographing mode are not detected and stored.

Figure 14:
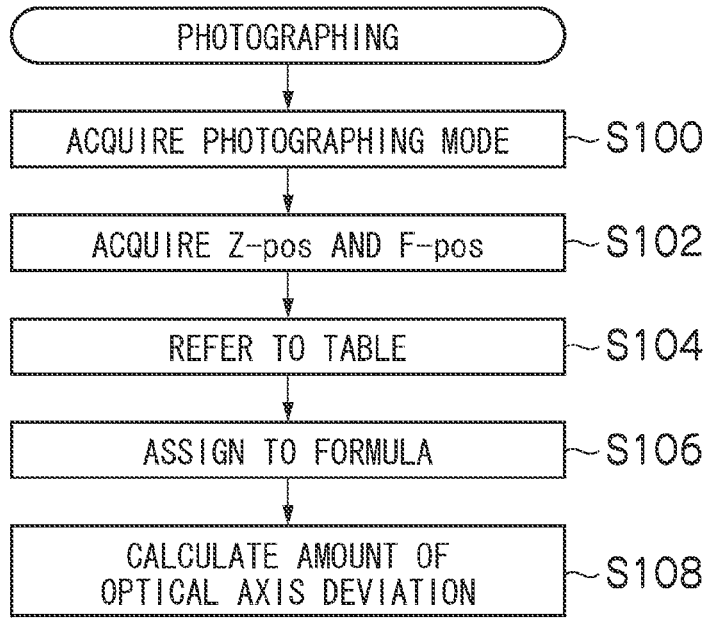
FIG. 14 is a flow chart showing an embodiment of calculating an amount of optical axis deviation after the distortion correction based on computation.

The table of the amounts of optical axis deviation of each zoom position stored in the EEPROM 48 is used to calculate the amounts of optical axis deviation after the distortion correction at the time of photographing as shown in FIG. 14.

In FIG. 14, information of the current photographing mode and information of the zoom position and the focus position of the zoom lenses are acquired (steps S100 and S102).

Based on the acquired information of the zoom position and the focus position, the table stored in the EEPROM 48 is referenced to acquire the amounts of optical axis deviation corresponding to the zoom position and the focus position (step S104). Based on the acquired current photographing mode and current zoom position, the distortion correction formula (calculating formula) corresponding to the current photographing mode and zoom position is acquired from the EEPROM 48.

The amount of optical axis deviation acquired in step S104 is assigned to the acquired formula to calculate the amount of optical axis deviation after the distortion correction (steps S106 and S108).

The calculated amount of optical axis deviation is used for the cut-out process of image in steps S84, S88, and S88 shown in FIG. 11 and step S886 shown in FIG. 12.

In this way, the amounts of optical axis deviation before the distortion correction are held in the EEPROM 48, and the values held in the EEPROM 48 are applied to the formula of the distortion correction at the cut-out process of actual image to calculate amounts of optical axis deviation after the distortion correction. As a result, the memory capacity of the EEPROM 48 can be reduced, and the cut-out position can be easily changed even if firmware or the like is changed (including change in the distortion correction).

Although the tables of the amounts of optical axis deviation store the amounts of optical axis deviation at each zoom position as shown in FIGS. 10A to 10C, only the amounts of optical axis deviation of at least two zoom positions (for example, wide end and telephoto end) may be stored, and the amounts of optical axis deviation at zoom positions other than the stored zoom positions may be calculated by linearly interpolating the amounts of optical axis deviation at the stored at least two zoom positions in accordance with the current zoom position.

[Second Embodiment of Image Processing]

Figure 15:
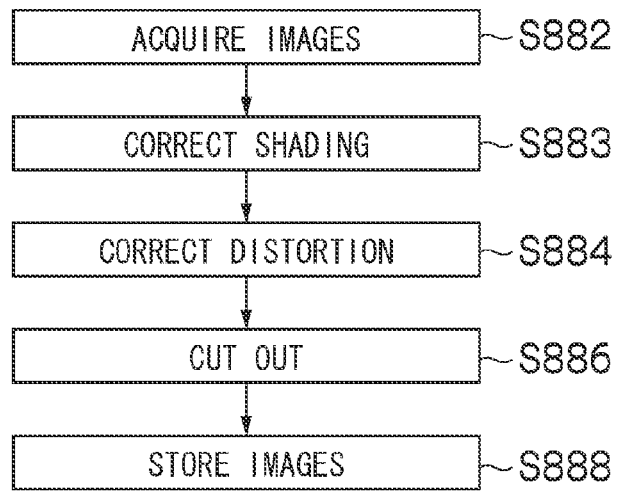
FIG. 15 is a flow chart showing a second embodiment of the image processing in FIG. 11.

FIG. 15 is a flow chart showing a second embodiment of the image processing in step S88 of FIG. 11 and so forth. Common parts with the first embodiment of FIG. 12 are designated with the same step numbers, and the detailed description will not be repeated.

The second embodiment of the image processing shown in FIG. 15 is different from the first embodiment in that step S883 of shading correction is added before step S884 of distortion correction compared to the first embodiment shown in FIG. 12.

More specifically, in step S883, the luminance of the pixels of the left and right images acquired in step S882 is corrected (shading correction) based on tables of left and right images that store shading correction values corresponding to the angle of view position or based on shading correction values calculated by a formula according to the angle of view position.

As a result of the shading correction, the distortion correction and the cut-out process of image are performed after equalization of the brightness of the left and right images, and images without a difference in the brightness between the cut out left and right images can be formed.

[First Embodiment of Image Processing in Continuous Photographing]

Continuously photographed images are viewed as still images, and image processing similar to that for 3D still images is required. More specifically, the distortion correction needs to be carried out based on a distortion correction formula with high correction accuracy.

Meanwhile, if the imaging intervals of the continuous photographing are short, the distortion correction with high correction accuracy, the cut-out process of image, and the like cannot be performed in real time.

Figure 16:
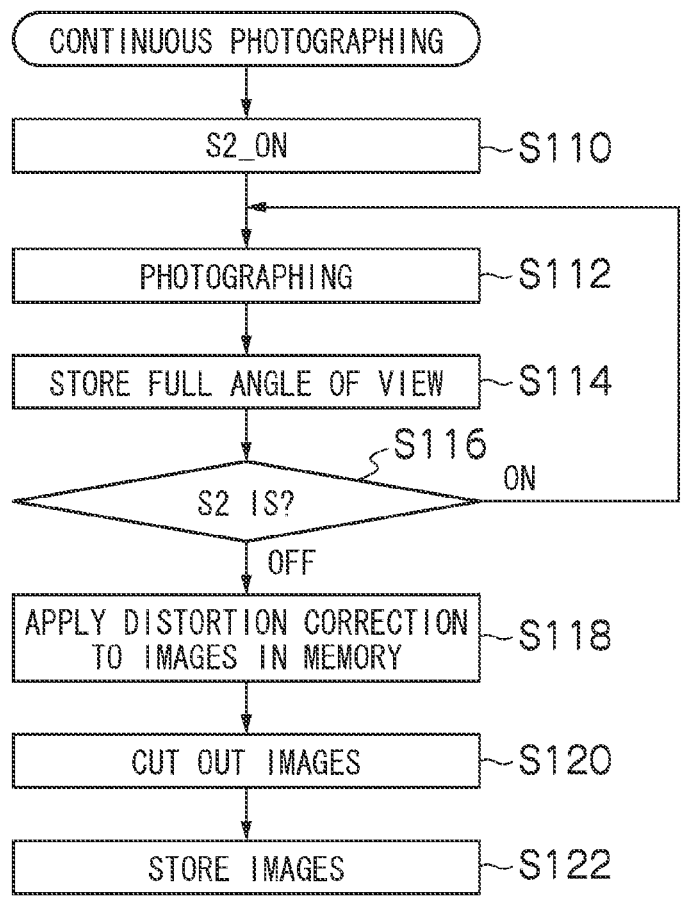
FIG. 16 is a flow chart showing a first embodiment of image processing in continuous photographing.

FIG. 16 is a flow chart showing a first embodiment of the image processing in the continuous photographing.

When the continuous photographing mode is set and an instruction (ON of the switch S2) of the continuous photographing is inputted (step S110), the CPU 32 takes images of one frame of continuous photographing (step S112) and temporarily stores left and right images of full angle of view in the RAM 54 (step S114).

Subsequently, ON/OFF of the switch S2 is determined (S116). If the switch S2 is ON, the process moves to step S112. If the switch S2 is OFF, the process moves to step S118. More specifically, the continuous photographing is performed when the switch S2 is ON, and the left and right images of full angle of view are stored in the RAM 54.

When the switch S2 is turned OFF, the time-series left and right images stored in the RAM 54 are read out frame by frame, and the distortion is corrected based on the zoom position of the zoom lenses in the continuous photographing and the distortion correction formula corresponding to the continuous photographing mode (step S118).

Subsequently, the amounts of optical axis deviation corresponding to the zoom position of the zoom lenses in the continuous photographing, the focus position, and the continuous photographing mode are read out from the EEPROM 58 or calculated, and images for correcting the optical axis deviation are cut out from the images of full angle of view in which the distortion is corrected based on the amounts of optical axis deviation (step S120).

A compression process or the like is applied to the cut out images, and the images are recorded in the memory card 40 (step S122).

[Second Embodiment of Image Processing in Continuous Photographing]

Figure 17:
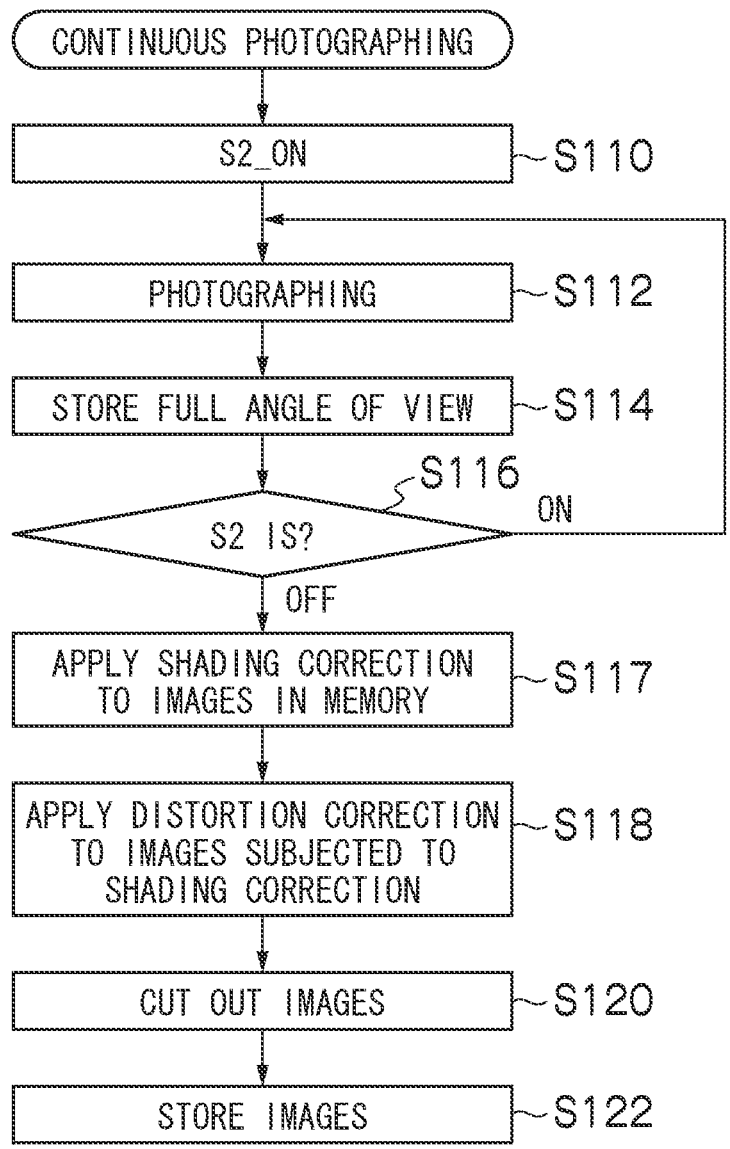
FIG. 17 is a flow chart showing a second embodiment of the image processing in the continuous photographing.

FIG. 17 is a flow chart showing a second embodiment of the image processing in the continuous photographing. Common parts with the first embodiment of the imaging process in the continuous photographing shown in FIG. 16 are designated with the same step numbers, and the detailed description will not be repeated.

The second embodiment of the image processing in the continuous photographing shown in FIG. 17 is different from the first embodiment in that a process of step S117 is added between steps S116 and S118.

More specifically, in step S117, a shading correction corresponding to each angle of view position is applied to the left and right images stored in the RAM 54 to equalize the brightness of the left and right images. As a result, images without a difference in the brightness between the left and right images, for which the distortion correction and the cut-out process of image of subsequent stages will be performed, can be formed.

[Third Embodiment of Image Processing in Continuous Photographing]

Figure 18:
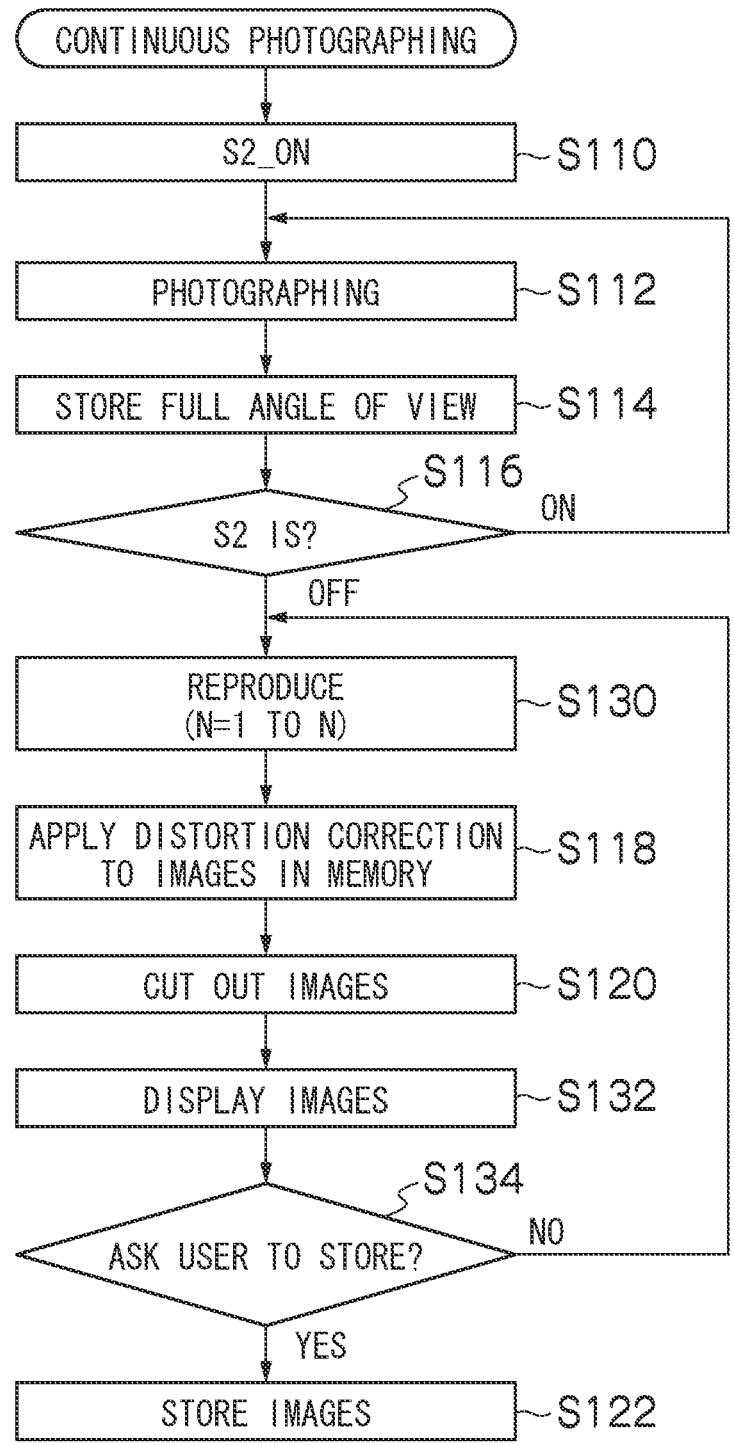
FIG. 18 is a flow chart showing a third embodiment of the image processing in the continuous photographing.

FIG. 18 is a flow chart showing a third embodiment of the image processing in the continuous photographing. Common parts with the first embodiment of the image processing in the continuous photographing shown in FIG. 16 are designated with the same step numbers, and the detailed description will not be repeated.

The third embodiment of the image processing in the continuous photographing shown in FIG. 18 is different from the first embodiment in that only images, for which the storage is instructed by the user, among a plurality of continuously photographed time-series images are stored in the memory card 40.

In FIG. 18, when the switch S2 is turned OFF (step S116), the time-series left and right images stored in the RAM 54 are read out and reproduced in the order of photographing (step S130).

Now, when photographing of 3D images is performed N times by continuous photographing, N-th left and right images are read out from N=1 to N indicating the order of photographing, and the distortion correction and cutting of images are performed (steps S118 and S120). The left and right images after the process are displayed as 3D still images on the liquid crystal monitor 16 (step S132).

The user determines whether to store the image in the memory card 40 while watching the 3D still image displayed on the liquid crystal monitor 16 (step S134). If "Yes" (for example, when the MENU/OK button is turned ON), the 3D still image displayed on the liquid crystal monitor 16 is stored in the memory card 40.

On the other hand, if "No" (for example, frame advancing is instructed by left/right keys of the cross keys), the process moves to S130 to read out the next left and right images from the RAM 54, and the same process is executed.

Although the continuous photographing is performed while the switch S2 is ON in the embodiment, the arrangement is not limited to this. A preset number of images may be continuously photographed when the switch S2 is turned ON.

[First Embodiment of Imaging/Reproduction Process]

Figure 19:
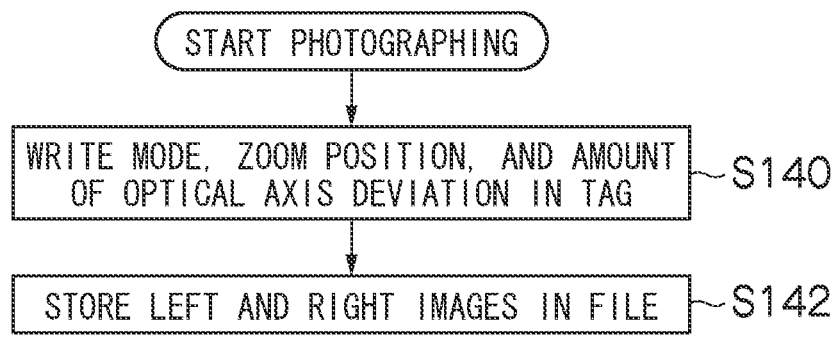
FIG. 19 is a flow chart showing a first embodiment of an imaging process of the stereoscopic imaging apparatus according to the present invention.
Figure 20:
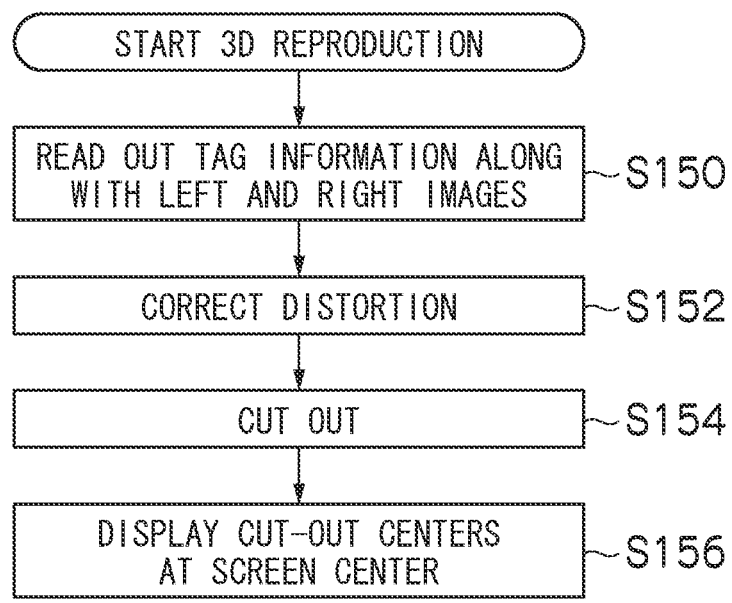
FIG. 20 is a flow chart showing a first embodiment of a reproduction process of the stereoscopic imaging apparatus according to the present invention.

FIGS. 19 and 20 are flow charts showing a first embodiment of an photographing/reproduction process of the stereoscopic imaging apparatus 10 according to the present invention.

In FIG. 19, when the stereoscopic imaging apparatus 10 is set to the photographing mode to start photographing, the photographing mode at the time of photographing (for example, 3D moving image photographing mode or 3D still image photographing mode), the zoom position of the zoom lenses, and the amounts of optical axis deviation are written in a tag of an image file recorded in the memory card 40 (step S140). The amounts of optical axis deviation is read out from the EEPROM 48 or calculated based on the photographing mode, the zoom position, and the focus position.

Photographed left and right images of full angle of view (moving image or still images) are stored in the image file (step S142).

Therefore, the distortion correction and the cut-out process of image are not performed at the time of photographing, and the images before the correction and information necessary for the correction are recorded in the tag.

Meanwhile, as shown in FIG. 20, when the stereoscopic imaging apparatus 10 is set to the reproduction mode to start the reproduction, the left and right images and the tag information are read out from the image file to be reproduced that is stored in the memory card 40 (step S150).

The distortion correction formula specified by the photographing mode and the zoom position included in the tag information is acquired, and the distortion correction formula is used to apply the distortion correction to the read out left and right images (step S152).

Subsequently, images for correcting the optical axis deviation are cut out from the left and right images after the distortion correction based on the amounts of optical axis deviation included in the tag information (step S154).

The cut out left and right images are displayed so that the cut-out center is at the center of the screen of the liquid crystal monitor 16 (step S156), and as a result, a 3D image that allows easy stereoscopic vision without optical axis deviation is displayed.

Because the images of full angle of view are stored, a picture print with a wider field of view can be obtained when 2D picture printing is performed. One of the cut out images can also be reproduced when the user selects the 2D reproduction. As a result, the size of the angle of view of the 3D image can be recognized even if the eyes are tired in the 3D reproduction and the user switches to the 2D reproduction.

Although the amounts of optical axis deviation are recorded as the tag information in the embodiment, the coordinates of the optical axis center or the coordinates of the opposing corners of the cut-out range may be recorded instead of the amounts of optical axis deviation. In a word, any information can be recorded as long as the information is information on image cut-out which enables to correct the optical axis deviation.

The images subjected to the distortion correction and the cut-out process of image in the 3D reproduction can also be recorded in the memory card 40. In that case, the original image file may be deleted, or both image files may exist.

[Second Embodiment of Photographing/Reproduction Process]

Figure 21:
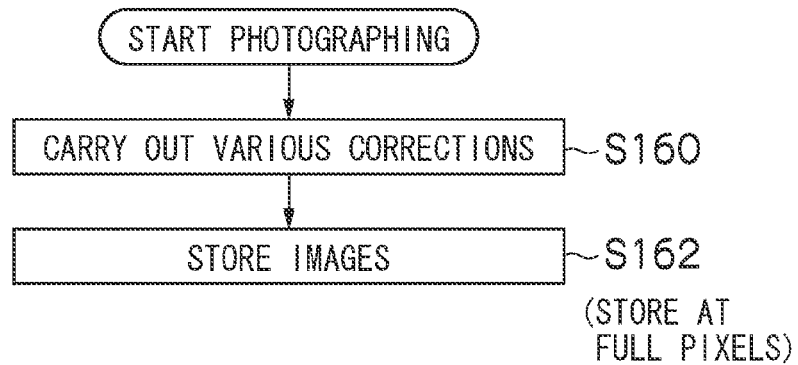
FIG. 21 is a flow chart showing a second embodiment of the imaging process of the stereoscopic imaging apparatus according to the present invention.
Figure 22:
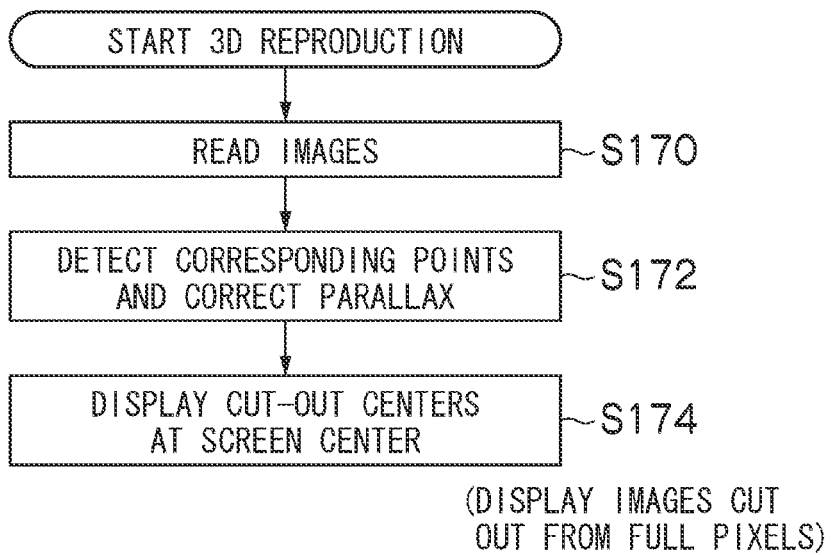
FIG. 22 is a flow chart showing a second embodiment of the reproduction process of the stereoscopic imaging apparatus according to the present invention.

FIGS. 21 and 22 are flow charts showing a second embodiment of the photographing/reproduction process of the stereoscopic imaging apparatus 10 according to the present invention.

In FIG. 21, when the stereoscopic imaging apparatus 10 is set to the photographing mode to start photographing, various correction processes are applied to the photographed left and right images of full angle of view (moving image or still images) (step S160). The image processing here is image processing other than the cut-out process of image for correcting the optical axis deviation of the left and right images, and the image processing includes white balance correction, gamma correction, shading correction, distortion correction, and the like.

The left and right images subjected to the image processing are compressed in a predetermined compression format and stored in the memory card 40 (step S162).

Meanwhile, as shown in FIG. 22, when the stereoscopic imaging apparatus 10 is set to the reproduction mode to start the reproduction, the left and right images are read out from the image file to be reproduced that is stored in the memory card 40 (step S170).

Subsequently, the corresponding point detection for detecting the corresponding feature points of the left and right images is performed to acquire information for correcting the optical axis deviation of the left and right images (step S172). The corresponding points can be detected by, for example, the block matching method.

Based on one of the left and right images (for example, left image), pixels of the left image corresponding to pixels of the other image (right image) are obtained by the corresponding point detection. The corresponding point detection can obtain areas where the corresponding points can be detected between the left and right images and can obtain areas where the corresponding points cannot be detected. Information for correcting the optical axis deviation of the left and right images can be acquired by detecting areas surrounded by four outermost sides of the areas where the corresponding points of the left and right images can be detected.

More specifically, the center of the area surrounded by four sides is the cut-out area for cutting the image for stereoscopic vision from the pixels of the entire angle of view, and the center of the area surrounded by four sides is the cut-out center.

The left and right images cut out from the left and right images of full angle of view based on the obtained cut-out areas are displayed so that the cut-out centers are at the center of the screen of the liquid crystal monitor 16 (step S174). As a result, a 3D image that allows easy stereoscopic vision without optical axis deviation is displayed.

Figure 23:
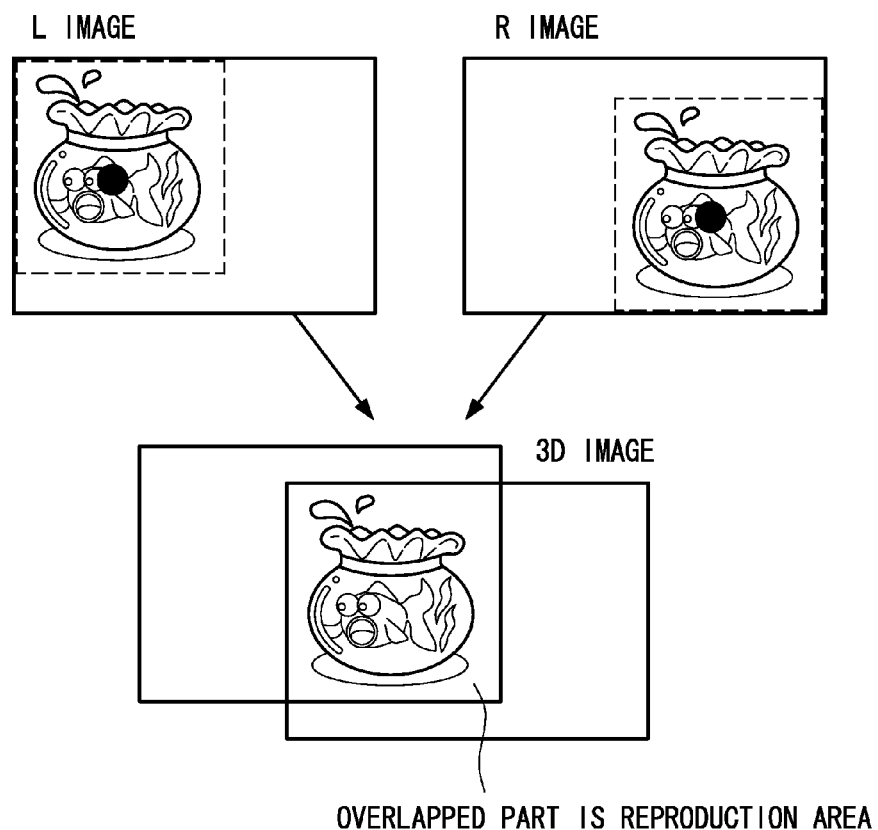
FIG. 23 is a diagram used to explain a cut-out process of images of the second embodiment in the imaging/reproduction shown in FIGS. 17 and 18.

For example, the cutting areas (areas specified by the cut-out start point or the cut-out center, and the cut-out size) shown by dotted lines obtained by the corresponding point detection are cut out from the left and right images of full angle of view as shown in FIG. 23, and the cut out images (left and right overlapped parts) are displayed on the liquid crystal monitor 16 as images for stereoscopic vision. In this case, the cut-out centers of the left and right images are matched and displayed. Therefore, the optical axis deviation (deviation in the V direction) of the left and right images is corrected.

Although only the overlapped parts of the left and right images are displayed in the example, the arrangement is not limited to this. Displays as shown in the following a) to c) are also possible.

a) The parts that do not overlap in the left and right images are displayed without change. As a result, the overlapped parts are three-dimensionally displayed, and the parts that do not overlap are two-dimensionally displayed.

b) A pattern, such as a picture frame, is arranged on the parts that do not overlap in the left and right images in the 3D display.

c) The parts that do not overlap in the left and right images are deleted (blackened or whitened) in the 3D display.

[Others]

Substantially the same subject exists at the cut-out centers of the left and right images from which the images are cut out. Therefore, an MTF (modulation transfer function) measurement of the cut-out center parts of the left and right images is performed to calculate the difference in the resolution between the left and right images. The image quality setting (edge enhancement and gamma correction) and the like of the left and right images can be changed to equalize the resolution of the left and right images.

The stereoscopic imaging apparatus 10 can display 3D through images on the liquid crystal monitor 16, and the user operates the parallax adjustment switch 18B (FIG. 1B) while watching the 3D through images to adjust the amount of parallax of the 3D images (moving image or still images).

More specifically, the parallax adjustment switch 18B can be operated in the + (plus) direction or the − (minus) direction to increase and decrease the amount of parallax (parallax adjustment value) of the 3D images.

The information of the amounts of optical axis deviation and the parallax adjustment value (amount of shift in the H direction of the left and right images) can be used in the cut-out process of image to cut out the images to record and reproduce 3D images with a user's desired stereoscopic effect without optical axis deviation in the V direction.

The plurality of photographing modes for carrying out the distortion correction with different correction accuracy are not limited to the embodiments. A photographing mode without the execution of the distortion correction or a photographing mode for emphasizing the distortion such as a fisheye photographing mode may also be included.

The cut-out process of image is applied to the images after the distortion correction in the embodiments. However, conversely, the distortion correction may be applied to the images subjected to the cut-out process of image for correcting the optical axis deviation. It is obvious that the cut-out process of image in this case is executed in consideration of the optical axis deviation by the subsequent distortion correction.

It is obvious that the present invention is not limited to the embodiments, and various changes can be made without departing from the spirit of the present invention.

Reference Signs List

10 . . . stereoscopic imaging apparatus, 11 . . . shutter button, 12 . . . zoom button, 14-1, 14-2 . . . imaging optical systems, 16 . . . liquid crystal monitor, 20-1, 20-2 . . . imaging units, 21 . . . focus lens and zoom lens, 24 . . . CCD, 25 . . . analog signal processing unit, 32 . . . central processing unit (CPU), 34 . . . operation unit, 44 . . . digital signal processing unit, 54 . . . RAM, 56 . . . ROM, 58 . . . EEPROM

The invention claimed is:

1. A stereoscopic imaging apparatus, comprising:
a plurality of imaging units that include imaging optical systems and imaging elements for photoelectrically converting subject images formed through the imaging optical systems and that image a plurality of images with a parallax;
a storage unit that stores amounts of optical axis deviation of the imaging optical systems with respect to a plurality of focus positions and zoom positions detected in advance;
a position detection unit that detects current focus positions and zoom positions of the plurality of imaging optical systems;
an optical axis deviation acquisition unit that acquires amounts of optical axis deviation corresponding to the current focus positions and zoom positions of the imaging optical systems detected by the position detection unit based on the amounts of optical axis deviation of the imaging optical systems;
an imaging control unit that acquires a plurality of images for stereoscopic image from the plurality of imaging units;

an image cut-out unit that performs a cut-out process of images for stereoscopic display from the plurality of images acquired by the imaging control unit, based on the amounts of optical axis deviation acquired corresponding to the current focus position and the zoom position by the optical axis deviation acquisition unit; and a distortion correction unit that corrects distortion of the plurality of images acquired by the imaging control unit based on a distortion correction formula corresponding to the zoom positions detected by the position detection unit out of distortion correction formulas having different correction accuracies for each of the zoom positions, wherein the optical axis deviation acquisition unit acquires the amount of optical axis deviation after the distortion correction based on the distortion correction formula corresponding to the zoom positions detected by the position detection unit.

2. The stereoscopic imaging apparatus according to claim 1, comprising a distortion correction formula acquisition unit that acquires the predetermined distortion correction formula corresponding to a current zoom position from distortion correction formulas corresponding to zoom positions of the imaging optical systems.

3. The stereoscopic imaging apparatus according to claim 2, further comprising a zoom position detection unit that detects the current zoom position of the plurality of imaging optical systems, wherein the distortion correction formula acquisition unit comprises:

a storage unit that stores distortion correction formulas corresponding to the zoom positions of the imaging optical systems in accordance with the zoom positions; and a reading unit that reads out a corresponding distortion correction formula from the storage unit based on the current zoom position.

4. The stereoscopic imaging apparatus according to claim 1, wherein the optical axis deviation acquisition unit comprises:

a storage unit that stores the amounts of optical axis deviation before the distortion correction; and a calculation unit that assigns the amount of optical axis deviation read out from the storage unit to the predetermined distortion correction formula to calculate an amount of optical axis deviation after the distortion correction.

5. The stereoscopic imaging apparatus according to claim 1, further comprising a shading correction unit that corrects shading of the plurality of images acquired by the imaging control unit, wherein the image cut-out unit applies the cut-out process of image to the images which has subjected to the shading correction by the shading correction unit.

6. The stereoscopic imaging apparatus according to claim 5, comprising:

a unit that selects a continuous photographing mode for acquiring a preset number of time-series images from the plurality of imaging units or acquiring a plurality of images during a photographing instruction period; and an internal storage unit that temporarily stores images photographed in the continuous photographing mode, wherein the shading correction unit reads out the plurality of images stored in the internal storage unit after the completion of photographing in the continuous photographing mode to perform the shading correction.

7. The stereoscopic imaging apparatus according to claim 1, wherein the image cut-out unit applies the cut-out process of image to the images after the distortion correction by the distortion correction unit.

8. The stereoscopic imaging apparatus according to claim 1, comprising:

a mode selection unit that selects a photographing mode or a reproduction mode; and a recording unit that records, in a recording medium, the plurality of images acquired by the imaging control unit during the photographing mode selected by the mode selection unit as well as the distortion correction formula acquired by the distortion correction formula acquisition unit and the amount of optical axis deviation acquired by the optical axis deviation acquisition unit in association with the plurality of acquired images, wherein the distortion correction unit and the image cut-out unit read out the plurality of images from the recording medium in the reproduction mode selected by the mode selection unit as well as the distortion correction formula and the amount of optical axis deviation stored in association with the images and apply the distortion correction, and apply the cut-out process of image to the read out plurality of images based on the distortion correction formula and the amount of optical axis deviation.

9. The stereoscopic imaging apparatus according to claim 8, wherein the recording unit records, in the recording medium, the images which have subjected to the distortion correction and the cut-out process of image in the reproduction mode.

* * * * *